United States Patent

Xu et al.

(10) Patent No.: US 10,657,106 B2
(45) Date of Patent: May 19, 2020

(54) METHOD, COMPUTING DEVICE, AND DISTRIBUTED FILE SYSTEM FOR PLACEMENT OF FILE BLOCKS WITHIN A DISTRIBUTED FILE SYSTEM

(71) Applicant: Taiwan Semiconductor Manufacturing Co., Ltd., Hsinchu (TW)

(72) Inventors: Haibo Xu, San Diego, CA (US); David Gell, San Diego, CA (US); Kenneth L. Stanwood, Vista, CA (US)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 309 days.

(21) Appl. No.: 15/484,146

(22) Filed: Apr. 11, 2017

(65) Prior Publication Data

US 2017/0220563 A1    Aug. 3, 2017

Related U.S. Application Data

(63) Continuation of application No. 14/038,123, filed on Sep. 26, 2013, now Pat. No. 9,633,041.

(51) Int. Cl.
*G06F 16/182* (2019.01)
*G06F 3/06* (2006.01)
*H04L 29/08* (2006.01)

(52) U.S. Cl.
CPC .......... *G06F 16/1827* (2019.01); *G06F 3/064* (2013.01); *G06F 3/0605* (2013.01); *G06F 3/065* (2013.01); *G06F 3/067* (2013.01); *G06F 3/0619* (2013.01); *G06F 3/0632* (2013.01); *G06F 3/0643* (2013.01); *G06F 16/1844* (2019.01); *H04L 67/1097* (2013.01)

(58) Field of Classification Search
CPC .. G06F 16/1827; G06F 16/1844; G06F 3/605; G06F 3/0632; G06F 3/064; G06F 3/0643; G06F 3/065; G06F 3/067; H04L 67/1097
See application file for complete search history.

(56) References Cited

U.S. PATENT DOCUMENTS

| 6,061,695 A * | 5/2000 | Slivka | G06F 17/2241 715/203 |
| 7,146,389 B2 * | 12/2006 | Ebata | G06F 3/0608 |
| 7,272,613 B2 * | 9/2007 | Sim | H04L 67/1008 709/223 |
| 7,546,354 B1 * | 6/2009 | Fan | G06F 11/2025 709/219 |

(Continued)

*Primary Examiner* — Uzma Alam
(74) *Attorney, Agent, or Firm* — JCIPRNET

(57) ABSTRACT

A method for file block placement in a distributed file system network that includes a plurality of data storage nodes, the method comprising the steps of generating a plurality of file block placement options for a file block, each block placement option being associated with at least one of the data storage nodes, the file block placement options being based on a set of network parameters associated with the distributed file system, determining a cost valuation parameter associated with each of the plurality of file block placement options, and selecting one of the plurality of file block placement options based at least in part on the cost valuation parameter associated with each file block placement option.

20 Claims, 9 Drawing Sheets

(56) References Cited

U.S. PATENT DOCUMENTS

| | | | | |
|---|---|---|---|---|
| 8,645,654 | B1* | 2/2014 | Bailey | G06F 3/0605 |
| | | | | 711/165 |
| 9,152,640 | B2* | 10/2015 | Tan | H04L 67/1097 |
| 2005/0044198 | A1* | 2/2005 | Okitsu | G06F 3/0608 |
| | | | | 709/223 |
| 2005/0251500 | A1* | 11/2005 | Vahalia | G06F 16/1774 |
| 2007/0091920 | A1* | 4/2007 | Harris | H04L 29/06027 |
| | | | | 370/468 |
| 2008/0198752 | A1* | 8/2008 | Fan | H04Q 3/0079 |
| | | | | 370/238 |
| 2009/0265391 | A1* | 10/2009 | Dai | H04L 41/08 |
| 2012/0047339 | A1* | 2/2012 | Decasper | G06F 11/1076 |
| | | | | 711/162 |
| 2012/0102291 | A1* | 4/2012 | Cherian | G06F 9/5044 |
| | | | | 711/170 |
| 2013/0110892 | A1* | 5/2013 | Wood | G06F 16/176 |
| | | | | 707/827 |
| 2013/0185229 | A1* | 7/2013 | Naga | G06F 12/123 |
| | | | | 705/418 |
| 2013/0212373 | A1* | 8/2013 | Dodgson | H04L 9/085 |
| | | | | 713/150 |
| 2014/0006350 | A1* | 1/2014 | Fukui | G06F 16/192 |
| | | | | 707/632 |
| 2014/0067887 | A1* | 3/2014 | Schabengerger | G06F 16/1827 |
| | | | | 707/827 |
| 2014/0095650 | A1* | 4/2014 | Resch | G06F 21/62 |
| | | | | 709/213 |
| 2015/0006596 | A1* | 1/2015 | Fukui | G06F 16/192 |
| | | | | 707/831 |
| 2016/0127339 | A1* | 5/2016 | Childs | G06F 16/148 |
| | | | | 726/7 |
| 2016/0315887 | A1* | 10/2016 | Uraizee | H04L 9/306 |
| 2016/0321287 | A1* | 11/2016 | Luthra | H04L 67/06 |
| 2016/0323381 | A1* | 11/2016 | Huang | H04L 67/1097 |
| 2017/0212910 | A1* | 7/2017 | Morris | G06F 16/5838 |
| 2017/0251260 | A1* | 8/2017 | Sanders | H04N 21/4668 |
| 2017/0302678 | A1* | 10/2017 | Borlick | H04L 63/105 |

* cited by examiner

METHOD, COMPUTING DEVICE, AND DISTRIBUTED FILE SYSTEM FOR PLACEMENT OF FILE BLOCKS WITHIN A DISTRIBUTED FILE SYSTEM

CROSS REFERENCE TO RELATED APPLICATION

This application is a continuation application of and claims the priority benefit of U.S. non-provisional application Ser. No. 14/038,123, filed on Sep. 26, 2013, now allowed. The entirety of the above-mentioned patent application is hereby incorporated by reference herein and made a part of specification.

TECHNICAL FIELD

The present disclosure generally relates to the field of distributed file systems and, in particular, to the placement of file blocks within a distributed file system.

BACKGROUND

As people have become increasingly connected to the Internet from home, at work or through mobile devices, more data is consumed through web browsing, video streaming, social networking, instant communication and e-commerce. At the same time, people generate more data by publishing photos, uploading videos, updating social network status, and purchasing goods and services on the Internet. This large amount of data is referred to as "web-scale" data or "big data." Known systems exist for the storage and processing of big data in a distributed manner across large numbers of computing and/or storage devices, which may be maintained in one or more clusters. An example of a distributed file system is the Google File System (GFS), which is a scalable distributed file system built with a large number of inexpensive commodity hardware devices for supporting large distributed data-intensive applications. GFS is used by Google's MapReduce programming model in which programs are automatically parallelized and executed on one or more large clusters built with commodity computers.

Another example of a distributed file system is the open source Apache Hadoop, which is a popular software framework that supports data-intensive distributed processing on large clusters of commodity hardware devices. Some companies currently use Apache Hadoop not only for their own distributed data storage and processing, but to offer distributed data storage and processing to customers via cloud-based services. Distributed file systems, such as Hadoop, save large data sets of big data by dividing a large data set into smaller blocks and storing the blocks in multiple nodes within a cluster that contains a large number of computers, each with its own data storage. To reduce the network bandwidth used for the processing of the large data set, the data processing code is moved to the computer node that contains the data blocks. This strategy of moving computation to the data, instead of moving data to the computation, seeks to maximize data locality and reduce unnecessary network transfers for the processing of the stored data.

A typical distributed file system cluster may be comprised of many racks of computers, where each rack contains a number of computers, such as 50 computers. Each computer on a rack is connected to the "top of rack" (ToR) switch on the rack. The top of rack switch on each rack is also connected to one or more aggregation or core switches in the cluster. Together the ToR, aggregation and core switches provide interconnectivity among all computers in the cluster, and access to the external world via one or more gateways connected to the cluster.

In such a distributed file system, one of the computers acts as a file manager node and the other computers act as storage nodes. The file manager node acts as a master that decides where blocks of a large file should be replicated when a file is created or appended. The file manager node also decides where extra replicas of a block should be stored when a storage node storing a block fails or when the replication value of the file is increased. By dividing a large file into blocks and storing multiple copies of each block in different storage nodes, the distributed file system is able to store a very large file (e.g., from terabytes to petabytes) reliably in a large cluster of computers running as storage nodes. Storage nodes can be added as needed to increase the storage capability of a cluster, and failed storage nodes can be replaced and the replicas of the file blocks stored in the failed storage nodes can be accessed from the other storage nodes in which they are stored.

Typically, the distributed file system handles a file storage request from a client of the system by creating an entry in the file manager node metadata to identify the new file. The client then breaks the data of the new file into a sequence of blocks. Then, starting with the first block of the new file and block by block, the client asks the file manager node for permission to append a new block to the new file, and the client then receives from the file manager node the ID of the new block and a list of the storage nodes where the block should be replicated.

After the client receives the list of storage nodes where the new block should be replicated, the client prepares a block write pipeline, such as: the client will send the ID of the new block and the IDs of other storage nodes to the 1st storage node, and request it to prepare to receive the new block; the 1st storage node will request the 2nd storage node to prepare to receive the new block, and the 2nd storage node will request the 3rd storage node to prepare to receive the new block, and so on so forth until all storage nodes are ready to receive the new block. After the block write pipeline is prepared, the client initiates the block copies by copying the new block to the 1st storage node. Next, the 1st storage node copies the new block to the 2nd storage node, and so on, until the block is replicated the number of times specified by the replication factor of the file.

The placement of file block replicas is important to the reliability and performance of the distributed file system. While placing the replicas of a block in storage nodes located in different racks can improve reliability against rack failure, it may increase traffic loads in the top of rack switches and the core switches connecting the pipeline of storage nodes during block replication. Hadoop provides a rack-aware replica placement policy to improve data reliability, availability and some reduction of network bandwidth utilization. The default Hadoop rack-aware block placement policy tries to simultaneously meet two goals: (a) to place the replicas of a block in more than one rack to improve reliability against a single rack failure; and (b) to place multiple replicas in a single rack to reduce inter-rack traffic during block creation.

Unfortunately, such a block placement policy does not consider the real time status and conditions of the network and treats all the network connections between the storage nodes and the top of rack switches in the same manner. For example, a block replica may be designated for placement in a storage node even when the block replication pipeline would be congested at the network connection to/from that storage node. Furthermore, once a block placement decision has been made, no effort is made in the network to prepare for and support the upcoming transfers to be used by the block placement pipeline. The block replication transfer operations are left to contend and compete with all other traffic on the network. Accordingly, such a block placement policy may lead to inefficient use of the cluster network for block placement and may lead to increased congestion in the network connections to/from storage nodes and in the top of rack switches and the core switches of the cluster.

This may also lead to a problem for client users, such as clients of a cloud-based file distribution and data processing system, that have certain timing and service level requirements related to the client's Service Level Agreement (SLA) and/or contracted Quality of Service (QoS) requirements. This is because the default block placement policy does not consider any notion of service assurance via the client's Service Level Agreement (SLA) and/or and QoS requirements during the block placement decision process. Accordingly, the block placement decision may not satisfy the client's SLA and QoS requirements because of network congestion to/from the various storage nodes in the block placement pipeline and in the ToR and core switches.

SUMMARY OF THE DISCLOSURE

Accordingly, the present disclosure is directed to a method, a computing device, and a system for implementing file blocks placement within a distributed file system.

In one aspect, a method is provided for file block placement in a distributed file system network that includes a plurality of data storage nodes, the method would include the steps at least of: generating a file block placement option for placement of a file block in at least one data storage nodes in the distributed file system network; generating a network control instruction set based at least in part on the file block placement option; and sending the network control instruction set to a controller node in communication with the distributed file system network.

In an aspect, the disclosure is directed to a computing device for file block placement in a distributed file system network that includes a plurality of network nodes. The computer device would include not limited to: a memory configured to store data and processing instructions and a processor configured to retrieve and execute the processing instructions stored in the memory to cause the processor to perform at least the steps of: generating a file block placement option for placement of a file block in at least one data storage nodes in the distributed file system network; generating a network control instruction set based at least in part on the file block placement option; and sending the network control instruction set to a controller node in communication with the distributed file system network.

In another aspect, the disclosure is directed to a distributed file system network which includes a network node, the distributed file system is configured at least to: generate a file block placement option for placement of a file block and to generate a network control instruction set based at least in part on the file block placement option; a controller node, configured to receive the network control instruction set for enable routing of the file block; at least one data storage nodes, configured to receive the file block for storage.

Other features and advantages of the present disclosure should be apparent from the following description which illustrates, by way of example, aspects of the disclosure.

BRIEF DESCRIPTION OF THE DRAWINGS

The details of the present disclosure, both as to its structure and operation, may be gleaned in part by study of the accompanying drawings, in which like reference numerals refer to like parts, and in which.

DETAILED DESCRIPTION OF DISCLOSED EMBODIMENTS

File block placement in a distributed file system (DFS) is provided in which network conditions are taken into account when determining the placement of file blocks. In an aspect, the determined file block placement is facilitated by utilizing Software Defined Networking (SDN) enabled networking functions. In an aspect an enhanced DFS block placement algorithm obtains the real time cluster topology from the SDN controller of a software defined network, obtains the real time status of the network, evaluates the impact of potential block placement combinations on a specific client's SLA and QoS requirements, selects an optimal block placement based on the real time cluster topology and network status, and, optionally, allocates resources in the SDN network accordingly in support of the upcoming transfers associated with the block placement selection.

Figure 1:
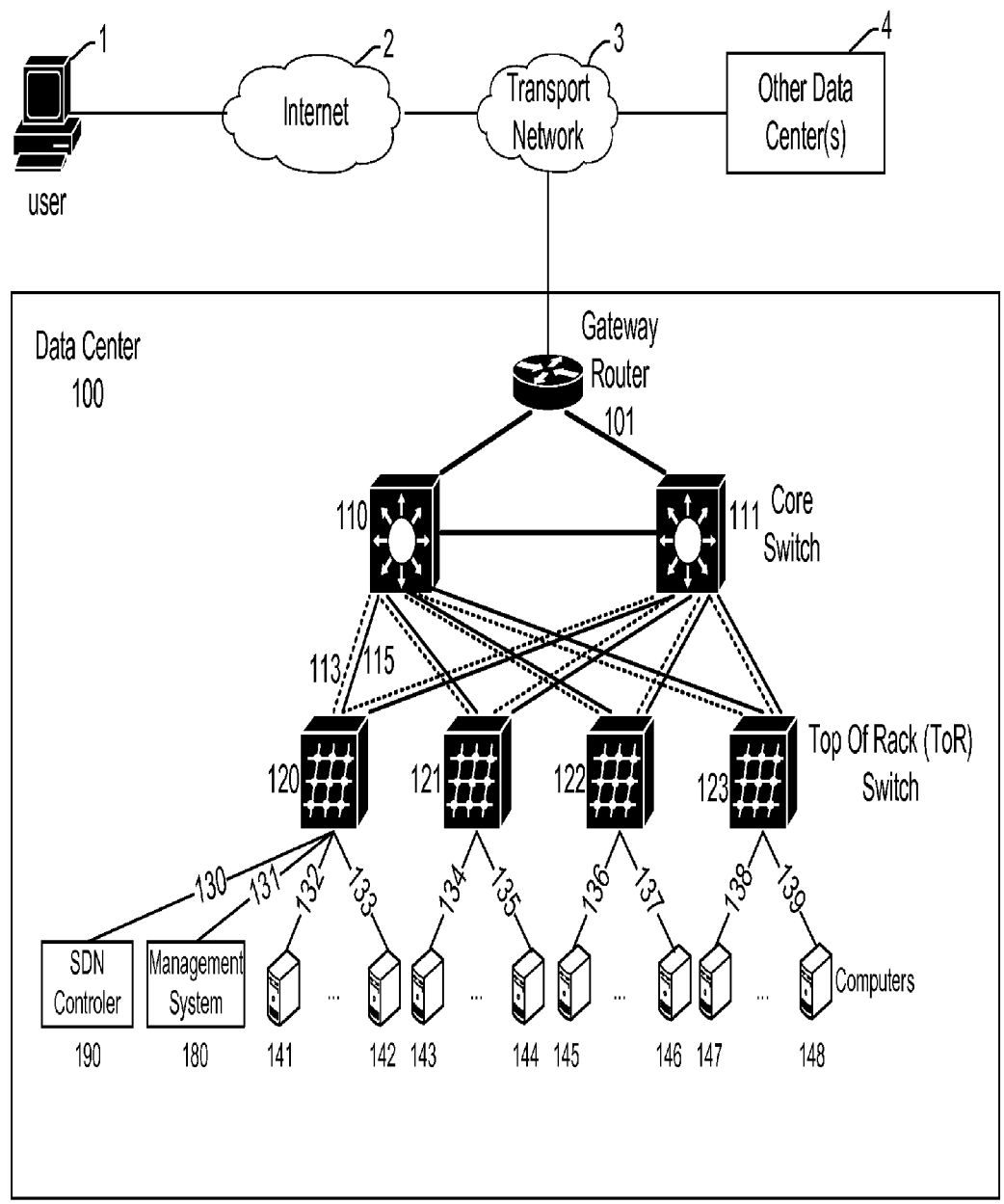
FIG. 1 is a block diagram of a distributed file system network in accordance with aspects of the disclosure.

FIG. 1 is a block diagram of a distributed file system (DFS) in which aspects disclosed herein may be implemented. As seen in FIG. 1, data center 100 is a cluster made up of many racks of computers (141-148, 180 & 190), each rack containing numerous computers. Each computer on a rack is connected to a top of rack switch (120-123) on the rack, and the top of rack switch on each rack is connected to one or more core switches (110, 111) of the data center 100. Data center 100 is connected to the Internet 2 through a transport network 3. A ToR (top of rack) switch is connected to multiple core switches with multiple connections to increase network reliability and performance of the cluster. The core switches 110 and 111 are interconnected with each other to exchange traffic between ToR switches (120-123). The core switches 110, 111 are connected to a gateway router 101 that provides network connectivity to the Internet 2 and other data centers 4. Each computer (141-148)

may run processes to implement the distributed file system function and the data processing function of the cluster, such as a task monitor process and a storage node process for implementation of the DFS functionality of the cluster. In the example of Hadoop, these processes are known as the TaskTracker and the DataNode functions, respectively.

In an aspect, each task monitor and storage node pair runs on a dedicated computer. For example, a task monitor and a storage node may run on physical computer 141. Alternatively, multiple task monitor and storage node pairs may run simultaneously on a single physical computer. For example, a task monitor 1, a storage node 1, a task monitor 2 and a storage node 2 may all run on computer 141. Computer operating system virtualization, such as VMware virtual machines or similar systems, may be used to support multiple task monitor and storage node pairs running on a single physical computer. In an aspect, one or more of computers 141-148 may run a file manager node (referred to as NameNode in Hadoop) process to oversee file system management and determine block file placement among the storage nodes. Alternatively, the file manager node function may reside in a dedicated computer, such as computer 180, separate from computers running task monitor and/or storage node processes.

The computers in the data center can also run other tasks. For example, computer 190 may run software defined network (SDN) controller software to function as a SDN controller for the cluster network of data center 100, and computer 180 may run tasks to operate as a data center management system server, e.g., element management system (EMS), network management system (NMS), or operations, administration, and maintenance (OAM) system, to support fault management, configuration management, accounting management, performance management and security management, among other tasks. As described above, a two-tier switch network consisting of ToR switches 120-123 and core switches 110, 111 is used to connect the computers of the cluster. It should be appreciated that other types of network topologies can also be used for this purpose. For example, a three-tier switch network may be used that consists of ToR switches, End of Row (EoR) switches and core switches. In such a three-tier switches network, the ToR switches are connected to the EoR switches and the EoR switches are connected to the core switches. Of course, the cluster of data center 100 in FIG. 1 is exemplary and other configurations of computer, switches and network interconnections may be utilized in practicing aspects of the present disclosure. A data center may use, for example, a fat-tree or a mesh network architecture. Other data center 4 may have a similar network architecture, and may be in communication with data center 100. In an aspect, other data center 4 can participate in file block placement processes described herein.

Figure 2:
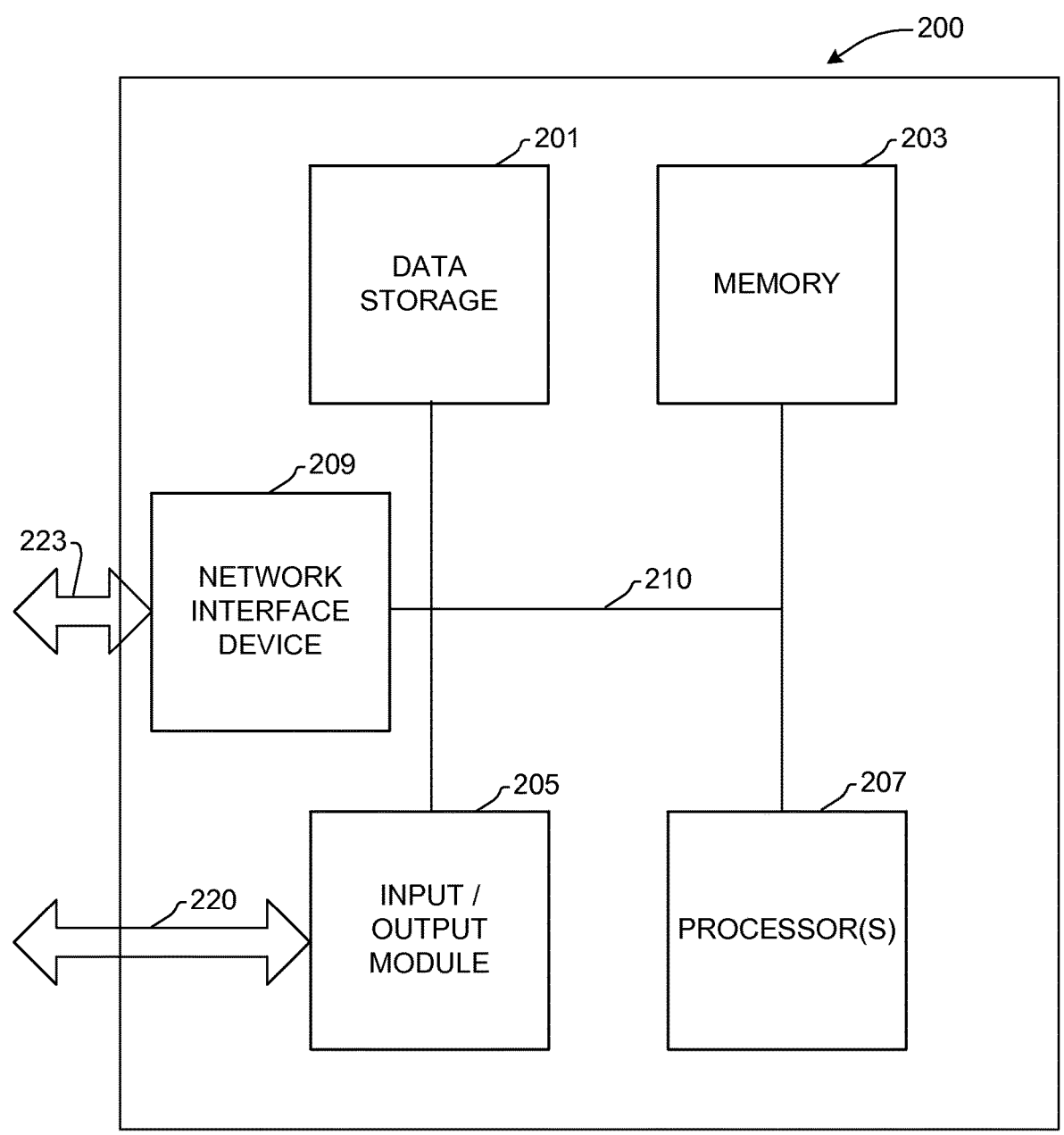
FIG. 2 is a block diagram of a network node in accordance with aspects of the disclosure.

FIG. 2 is a block diagram of a network node (or computer) in accordance with aspects of the disclosure. The computer 200 may be used, for example, to implement one of computers 141-148, 180 & 190 of data center 100 of FIG. 1. In FIG. 2, computer 200 includes a bus 210 or other communication device for communicating information, and a processor 207 coupled with bus 210 for processing information. Computer 200 also includes a memory 203, such as a random access memory ("RAM") or other dynamic storage device, coupled to bus 210 for storing information and instructions to be executed by processor 207. Memory 203 may also be used for storing temporary, variable or other intermediate information during execution of instructions by processor 207. Computer 200 further includes a data storage device 201, such as a magnetic disk drive, optical disk drive or solid state memory device, coupled to bus 210 for storing information and instructions.

Computer 200 may also include input/output (I/O) module 205 which optionally may be connected by connection(s) 220 to a display device (not illustrated), such as a cathode ray tube ("CRT"), liquid crystal display ("LCD"), light-emitting diode ("LED") display, organic light emitting diode (OLED) display, or other form of display for displaying information to a computer user. An input device, such as, for example, a keyboard, a mouse, a pointing device, a number of buttons, a microphone, and/or other inputs may also be optionally coupled to computer 200 via I/O module 205 for saving information to data storage device 201 and/or for communicating information and command selections to processor 207.

Network interface device 209 is also provided in computer 200 for one or more network connections to other computers, switches and devices in data center 100. Network interface device 209 may include one or more network interfaces that support wired and/or wireless connection(s) 223, and that may communicate via one or more protocols. For example, in an aspect, network interface device 209 may include one or more wired Ethernet network interfaces for connection(s) 223 that communicate via transmission control protocol (TCP)/internet protocol (IP). In an aspect, network interface device 209 may include one or more wireless network interfaces for connection(s) 223 that may communicate via WiFi, Bluetooth, LTE, WiMAX, CDMA, OFDM, or other wireless protocols. In an aspect, computer 200 may receive file blocks from other computers in data center 101 via network interface device 209, and may also send file blocks to other computers in data center 101 via network interface device 209.

According to an aspect, enhanced block placement functionality is performed by computer 200 by processor 207 executing one or more sequences of one or more instructions contained in memory 203. Such instructions may be read into memory 203 from another machine-readable medium, such as data storage device 201, or from an external machine-readable medium via I/O module 205. In an aspect, processor 207 may represent multiple processors arranged in a multi-processing arrangement to execute the sequences of instructions contained in memory 203, or received from another source via bus 210. In an alternative aspect, hard-wired circuitry may be used in place of or in combination with software instructions to implement the disclosure. Thus, embodiments of the disclosure are not limited to any specific combination of processors, hardware circuitry and software.

The term "machine-readable medium" as used herein refers to any medium or device that participates in providing instructions to processor 207 for execution. Such a medium may take many forms, including, but not limited to, non-volatile media, volatile media, and transmission media, such as a wired or wireless link. Non-volatile media include, for example, optical or magnetic disks, such as data storage device 201. Volatile media include dynamic memory, such as memory 203. Transmission media include coaxial cables, copper wire, and fiber optics, including the wires that comprise bus 210. Transmission media can also take the form of electromagnetic waves, acoustic waves, or light waves, such as those generated during radio frequency and infrared data communications. Common forms of machine-readable media include, for example, floppy disk, flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory device, chip or cartridge, a carrier wave, or any other medium from which a computer can read instructions or data. It should be appreciated that computer 200 may include other known components, devices and may be configured in other arrangements, while still supporting the implementation of the present disclosure.

Figure 3:
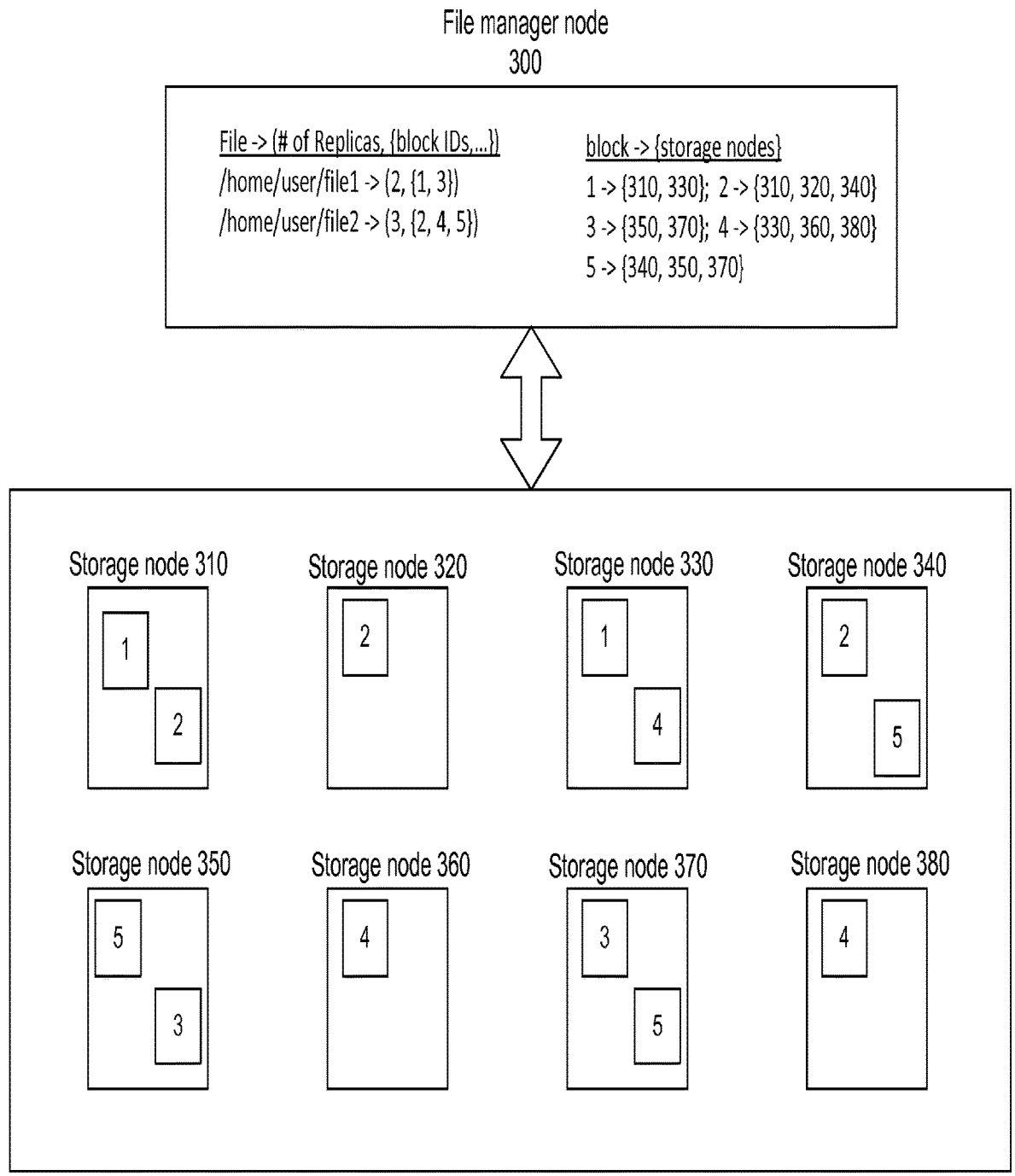
FIG. 3 is a block diagram of an exemplary block file placement in a distributed file system network in accordance with aspects of the disclosure.

FIG. 3 is a block diagram of an exemplary block file placement in a distributed file system network in accordance with aspects of the disclosure. The block diagram of Figure can provide a functional depiction of the cluster of data center 100 of FIG. 1, in which one of computers 141-148 is acting as a file manager node, and other computers are acting as storage nodes. In this regard, the cluster is depicted in FIG. 3 as including functional nodes including file manager node 300, and storage nodes 310-380 which are interconnected by network connections as described above. The example shown in FIG. 3 is a functional example of how files are broken into blocks and how each block is replicated across multiple storage nodes. As mentioned above, a DFS stores large data files in smaller fixed size blocks across a cluster. In an aspect, the size of each file block is the same, such as 64 MB for example, except for the last file block which may be smaller depending on the last remaining data. In another aspect, the file blocks may be of different sizes. In an aspect, each file block is replicated to multiple storage nodes to provide redundancy against node or rack failure in the cluster.

In an aspect, file manager node 300 and storage nodes 310-380 operate in a master-slave architecture. In an aspect, the file manager node and storage node functionalities are implemented in software designed to run on computers. The file manager node operates as a master that manages the file system namespace and maintains the file system directory tree and the metadata for all the files and directories in the tree. The file manager node manages all the operations such as creating, opening, closing and renaming files and directories. The file manager node also determines the mapping of files to their component blocks and the mapping of each of the blocks to the storage nodes where they are physically stored. The storage nodes store the file blocks and provide block reading/writing access to all users of the DFS service such as data processing administration (TaskTracker in Hadoop), and DFS import/export utilities. Storage nodes periodically report the list of blocks they are storing back to the file manager node in the form of periodic heartbeat and block report messages.

In the example of file block distribution shown in FIG. 3, two files, "/home/user/file1" and "/home/user/file2" are stored in the DFS cluster. File manager node 300 stores the mapping of the block IDs associated with each file along with the number of block replicas designated for the blocks of each file. In addition, file manager node 300 stores the mapping of each block to the storage nodes in which it is stored, based on the designated number of replicas for the file of which that block is a component. As seen in FIG. 3, the file "/home/user/file1" is broken into block IDs 1 and 3 and each block for this file is replicated 2 times. Similarly, the file "/home/user/file2" consists of block IDs 2, 4 and 5, and each block for this file is replicated 3 times. As shown in the diagram, the blocks making up the two files are replicated and stored in storage nodes 310-380 in the cluster according to the "block {storage nodes}" mapping shown in file manager node 300. As seen in the example shown in FIG. 3, block ID 1 of "/home/user/file1" is replicated in storage nodes 310 and 330, and block ID 3 of "/home/user/file1" is replicated in storage nodes 350 and 370. Similarly, block ID 2 of "/home/user/file2" is replicated in storage nodes 310, 320 and 340, block ID 4 of "/home/user/file2" is replicated in storage nodes 330, 360 and 380, and block ID 5 of "/home/user/file2" is replicated in storage nodes 340, 350 and 370, The DFS, such as that shown in FIG. 3, is designed to support local data processing at the site of the stored blocks, such as the MapReduce type of data processing in Hadoop. In an aspect, the file blocks stored in a DFS can be read in parallel by multiple processing tasks at the same time. The file manager node of the DFS provides a process monitor, such as the MapReduce JobTracker of Hadoop, with the location of each file block. The process monitor can use the file block locations to schedule the processing tasks to be performed on the nodes where a replica of a block is available. If a task processing a file block fails, the process monitor can reschedule the task to run in a different node containing a replica of the file block.

In this regard, the nodes in the cluster may communicate with each other over a TCP/IP connection(s). The process tracker function, the file manager node function and the storage node function expose their functionalities through interfaces such as the Remote Procedure Call (RPC) call. Each of these functions listens on a pre-configured TCP port and responds to the function call received on the TCP socket. For example, in Hadoop, Java application programming interfaces (APIs) are provided to encapsulate the RPC interfaces exposed by Hadoop MapReduce and Hadoop distributed file system (HDFS). With the Hadoop Java API, a data processing task can be programmed in the Hadoop MapReduce framework and such tasks can be easily scheduled to run in multiple nodes in the cluster. Such an API also enables programs to create and access files stored in the cluster without worrying about the internal details of the DFS. A client then uses the API to access the features and capabilities provided by the cluster. Many common utilities for file access and cluster maintenance are also provided.

Figure 4:
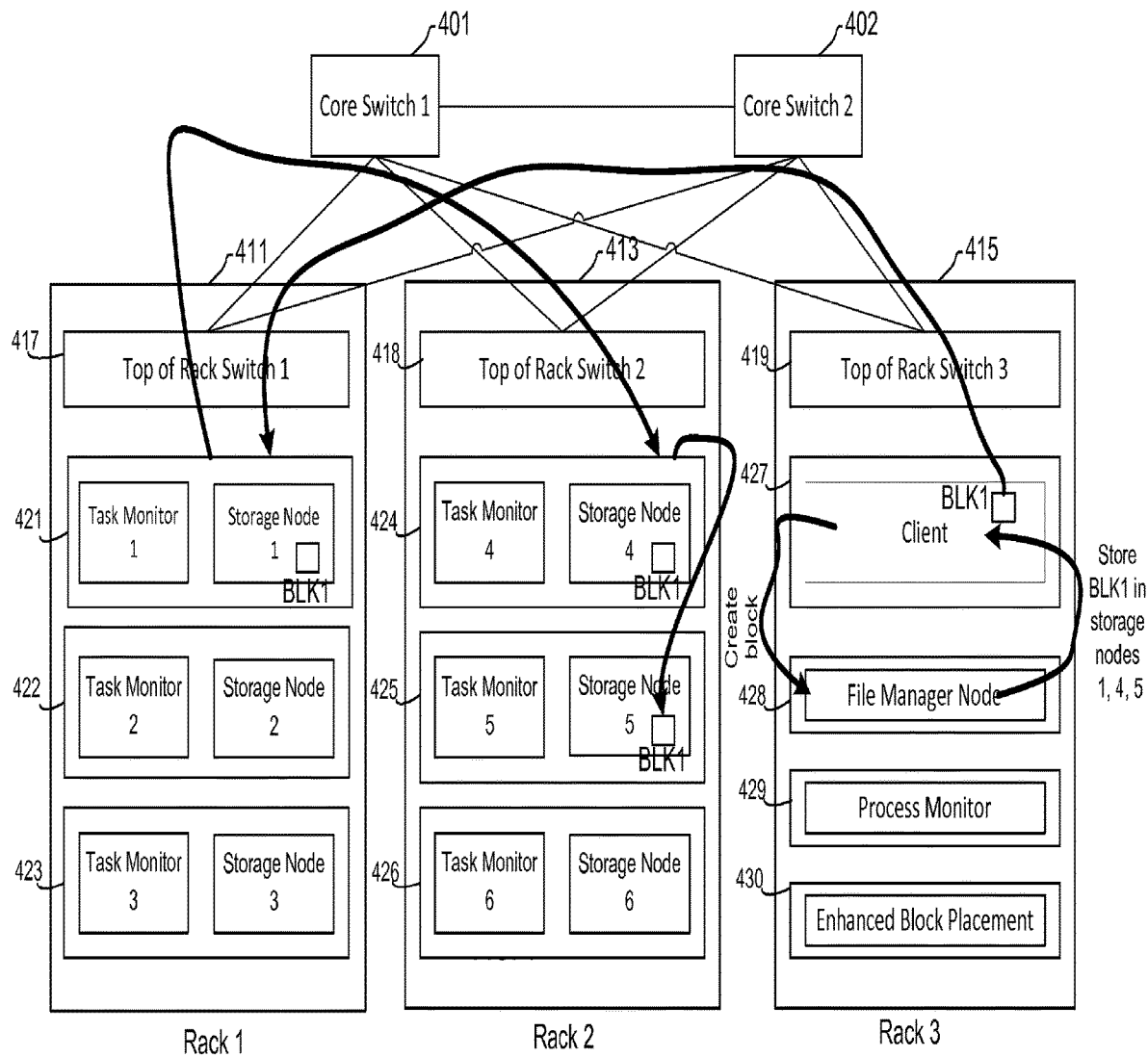
FIG. 4 is a block diagram showing network paths related to an exemplary block file placement in a distributed file system network in accordance with aspects of the disclosure.

FIG. 4 is a block diagram showing network paths related to an exemplary block file placement in a distributed file system network in accordance with aspects of the disclosure. FIG. 4 functionally depicts the file block replication process across multiple storage nodes in a distribution file system cluster. As seen in FIG. 4, three racks 411, 413 & 415 are shown, in which racks 411 and 413 contain three computers and a ToR switch. For example, rack 411 includes computers 421, 422 and 423, and ToR switch 417 which is connected to computers 421, 422 and 423. Each of the computers contained in racks 411 and 413 runs a task monitor process enabling it to support data processing of stored data and also runs a storage node process enabling it to function as a storage node for storage of file blocks. In this regard, the term "process" as used herein is used in the generic sense of a software procedure and the actual implementation may be in the form of an operating system process, a thread, a process implemented via a script, a daemon or other form of executable. The racks and switches of FIG. 4 may be implemented in the data center 100 of FIG. 1.

Rack 415 includes four computers 427, 428, 429 and 430 and a ToR switch 419. In the example of FIG. 4, computer 427 runs a client process enabling it to perform client tasks for a specific user of the distributed file system. In another aspect, the client process may be implemented in a computer external to data center 100, but in communication with data center 100. For example, the client process may be a client task that uses the distributed file system to store large data files in the distributed file system or to initiate data processing of data stored in the distributed file system. The client task may be performed on behalf of a user that is the operator of the distributed file system, or may be performed on behalf of a user that is external to the distributed file system and is utilizing the distributed file system via a cloud-based service. Computer 428 runs a file manager node process enabling it to function as the file manager node in the distributed file system cluster shown in FIG. 4, so as to control and track the mapping of files to their component blocks and the designation and mapping of blocks to storage nodes within the cluster. Computer 429 runs a process monitor process enabling it to function as the process monitor in the distributed file system cluster shown in FIG. 4, so as to control and monitor data processing tasks that may be distributed among the various task monitors operating in the computers of the cluster. Lastly, computer 430 runs an Enhanced Block Placement process enabling it to conduct enhanced placement of file blocks among the storage nodes in the cluster by also taking into account network conditions in the network paths to/from the various storage nodes and switches in the cluster.

The three ToR switches 417, 418 and 419 are each connected to both of core switches 401 and 402 for control and routing of data traffic among racks 411, 413 and 415, and for network connection of the cluster to an external network, such as the Internet or other data center(s). It should be appreciated that the configuration of functions and computers shown in FIG. 4 is exemplary and that other arrangements of the various functions within one or more computers are also possible for implementation of aspects of the disclosure.

FIG. 4 also depicts an example of file block replication and distribution among multiple storage nodes of the cluster. As described above, a file is stored in the distributed file system (DFS) as a sequence of blocks, all of which are the same size except, in some cases, the last block, and each file block is replicated in at least one storage node. In an aspect, the block size and replication factor may be configurable for each file. As the master node of the DFS, the file manager node decides where each file block should be replicated when the block is created. The file manager node also decides and designates where extra replicas of a block should be stored when a storage node storing the block fails or when the replication value of the file is increased.

When a client creates a new file in the DFS, it first requests the file manager node to create an entry in the file manager node metadata to identify the new file. The client then breaks the data of the new file into a sequence of blocks. Starting with the first block of the new file, and then block by block, the client asks the file manager node for permission to append a new block to the new file in DFS, and then the client receives from the file manager node the block ID of the new block and a list of storage nodes where the block is to be replicated. In the example of block creation shown in FIG. 4, computer 427 (as a client) first sends a request for the creation of new block to the file manager node 428. File manager node 428 then creates a new block ID of BLK1 in its metadata associated with the file, and determines that the new block should be replicated to storage node 1, storage node4 and storage node5, and returns this information back to client 427.

Client 427 then prepares a block write pipeline as follows: (1) the client is to send the new block ID and the IDs of other storage nodes (storage node4 and storage node5) to the storage node1, and requests storage node1 to prepare to receive the new block; (2) storage node1 is to request storage node4 to prepare to receive the new block, and the storage node4 is to request the storage node5 to prepare to receive the new block, and so on so forth until all designated storage nodes are ready to receive the new block. With the block write pipeline prepared, the client begins copies copying the new block to the storage node1 located in computer 421 of rack 411. As storage node 1 receives the new block, it begins copying the received portions of the block to storage node4 in computer 424 of rack 413, and so on, until the block is replicated the number of times specified by the designated replication factor for the file. Replicating file blocks in a pipeline fashion accelerates file creation and reduces the amount of processing the client needs to perform to store all replicas of the blocks of file. In the example shown in FIG. 4, the client copies the block to storage node1, storage node1 copies the block to storage node4, and storage node4 copies the block to the storage node5.

During file block replication and transfer to the designated storage nodes, each file block is divided into smaller portions referred to as packets. Each packet is typically the same size, such as 64 Kbytes for example. Once a storage node finishes receiving a file packet of a block from the previous storage node in the pipeline, it starts transmitting the file packet to the next storage node in the pipeline without waiting for all other file packets of the file block to be received.

Figure 5:
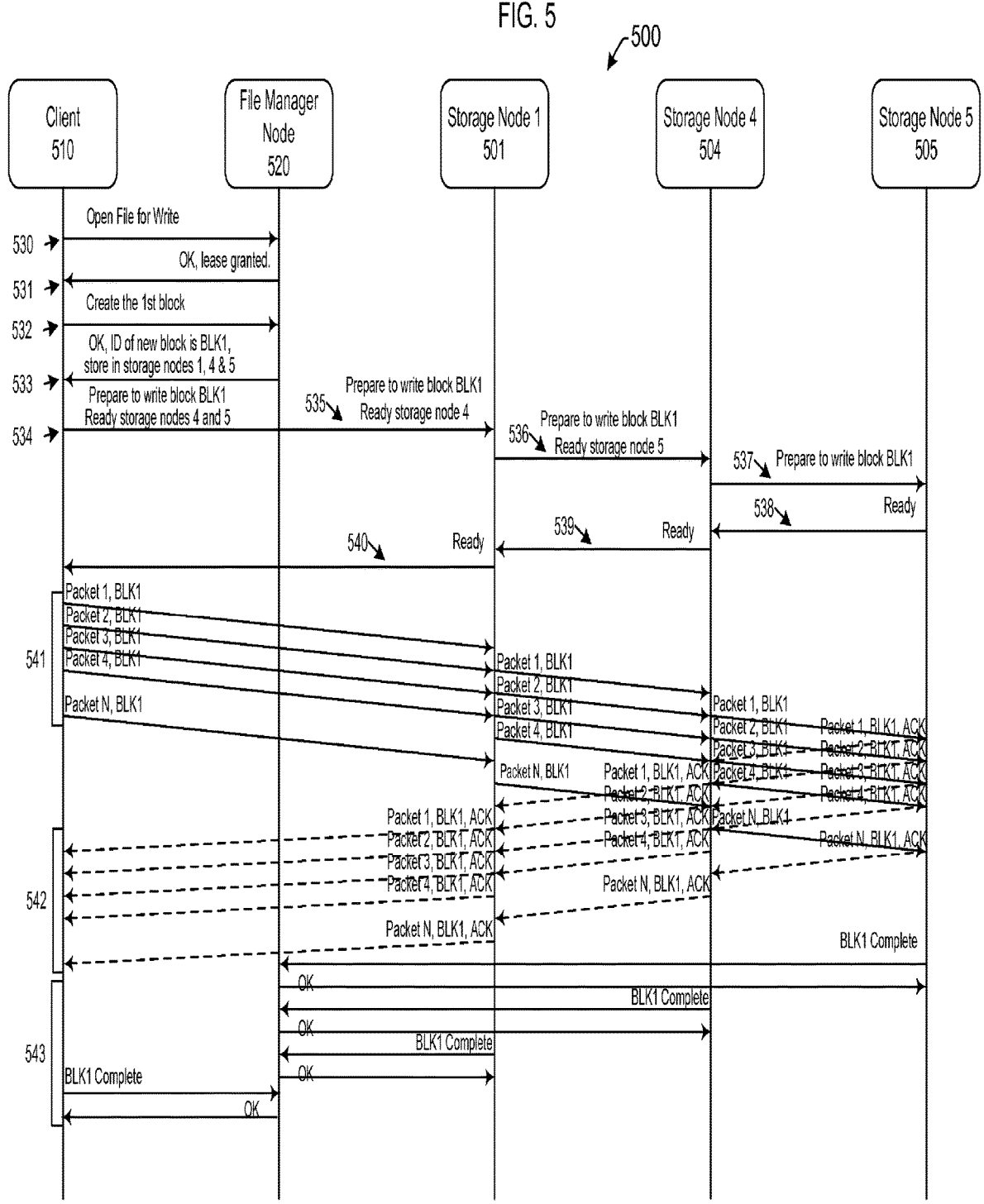
FIG. 5 is a sequence diagram showing block file creation and storage sequencing associated with an exemplary block file placement in a distributed file system network in accordance with aspects of the disclosure.

FIG. 5 is a sequence diagram showing block file creation and storage sequencing associated with an exemplary block file placement in a distributed file system network in accordance with aspects of the disclosure. FIG. 5 shows how the Client, the file manager node and the storage nodes of FIG. 4 interact to create the first block of a file and how that block is replicated across three of the storage nodes (1, 4 and 5). As shown in the FIG. 5, the process begins at step 530 in which Client 510 (corresponding to computer 427 in FIG. 4) sends a request to file manager node 520 (corresponding to computer 428 in FIG. 4) to open a new file for writing to the distributed file system (DFS) so that Client 510 can store a particular data file in the DFS. Next, file manager node 520 responds in step 531 with an OK to indicate that a lease was granted for Client 510 to write the new file in the DFS. In step 532, Client 510 partitions the file and creates the first block and sends the indication of the first block to file manager node 520 to obtain a block ID for the first block and a designation of the multiple storage nodes (referred to as the "pipeline" of storage nodes) in which replicates of the block are to be stored. In the example shown in FIG. 5, the new block is assigned a block ID of BLK1 by file manager node 520 and is designated by file manager node 520 to be replicated into storage node1 501, storage node4 504 and storage node5 505, and file manager node 520 replies to Client 510 with this information in step 533. Now that Client 510 has the storage node pipeline information from file manager node 520 for the first block BLK1, Client 510 proceeds in step 534 to send instructions to storage node1 501 to prepare to write block BLK1 and to ready storage node4 and storage node5 for writing of block BLK1.

As mentioned above, as each block of a file is sent to a storage node for storage, it is actually partitioned into smaller uniform-size packets for efficient transfer. In step 541, Client 510 sequentially initiates transfer of multiple packets (1, 2, ..., N) that make up block BLK1 to storage node1 501. As depicted in FIG. 5, once storage node1 and each subsequent storage node in the designated pipeline for the block receives a packet, they then begin transmission of the packet to the next storage node in the pipeline, without waiting for receipt of the next packet of that block. Similarly, in step 542, as each storage node receives a packet it then sends a packet acknowledgement back to the previous storage node in the pipeline that sent the packet, and the previous storage node sends the acknowledgement back to its previous storage node until the packet acknowledgment is finally received at Client 510. As seen in step 543, as the last packet of the block is received at a storage node, the storage node sends a block complete acknowledgement for that block (BLK1) back to file manager node 520, and when Client 510 receives the packet complete acknowledgements for all of the packets in the block, Client 510 sends a block complete acknowledgement for that block back to file manager node 520 It should be appreciated that the sequence scheme depicted in FIG. 5 is exemplary, and that other sequence arrangements for writing a block to multiple storage nodes in the DFS may be used to implement aspects of the disclosure.

In an aspect, an enhanced block placement process is used to designate a storage node pipeline for writing of a block that takes into account the state of the network connections in the cluster between the storage nodes and the expected timing requirements of the client, among other factors. Through the use of, for example, software defined network (SDN) functionality, the enhanced block placement algorithm can obtain the real time cluster topology from the SDN controller of the software defined network. The enhanced block placement algorithm can also obtain the real time status of the cluster network, evaluate the impact of potential block pipeline combinations on a client's SLA and QoS requirements, select an optimal block pipeline based on the real time cluster network topology and network status, and, optionally, allocate resources in the SDN accordingly to efficiently support the upcoming transfer of block data via the designated pipeline.

Figure 6:
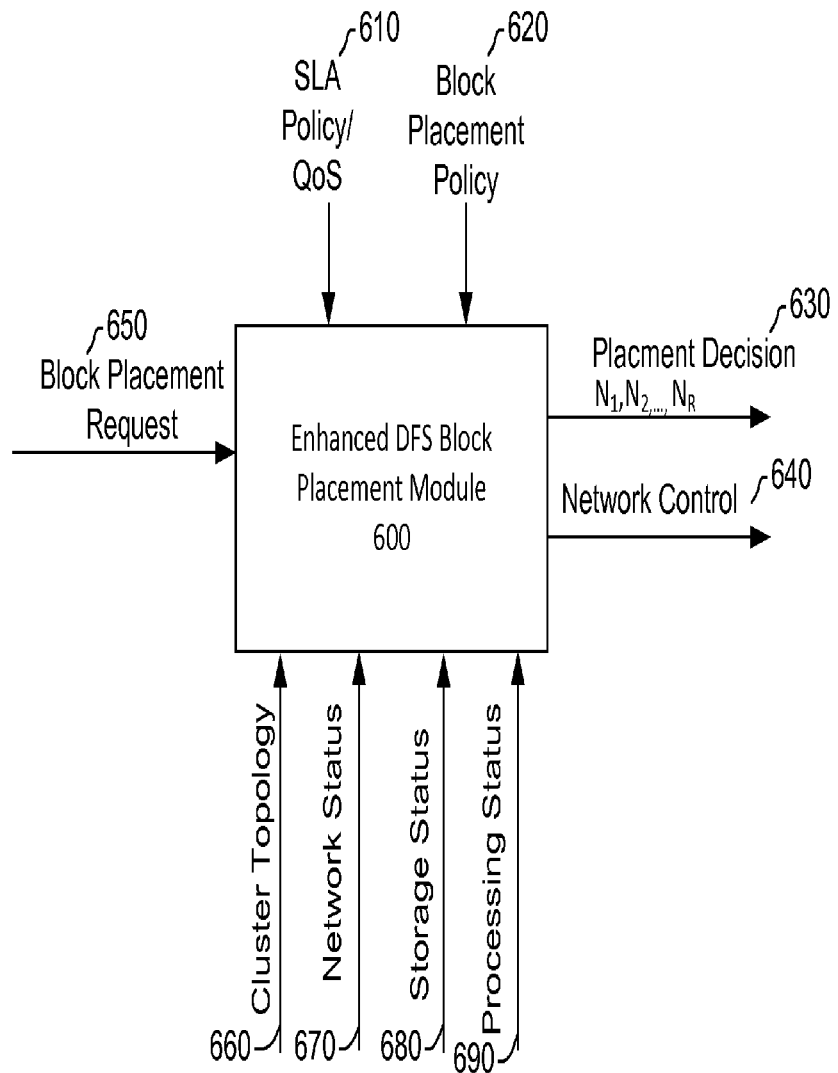
FIG. 6 is a block diagram of an enhanced block placement module in accordance with aspects of the disclosure.

FIG. 6 is a block diagram of an enhanced block placement module in accordance with aspects of the disclosure. The enhanced block placement module can provide designation of a storage node pipeline for use in, for example, the distributed file system network of FIG. 1. As seen in FIG. 6, enhanced DFS block placement module 600 has inputs that include the block placement request 650, the real time cluster topology 660, network status 670, storage status 680, processing status 690, block placement policy 620, client SLA policy and QoS requirements 610 and provides an optimum block placement decision 630 (storage node pipeline) for the client to write replicates of a file block in the DFS. In an aspect, enhanced DFS block placement module 600 may also output network control instructions to the SDN controller of the DFS to reconfigure the network in order to efficiently support the transfer of the block data via the storage node pipeline and thereby improve network performance and drive toward meeting the client's SLA and QoS requirements.

The enhanced DFS block placement process of module 600 shown in FIG. 6 can be implemented as part of the file manager node process, the process monitor process or a separate standalone process. Similarly, the enhanced DFS block placement process can be executed on the same computer that runs other processes such as file manager node or process monitor, or can be executed on a separate dedicated computer, as depicted by computer 430 in FIG. 4. The various inputs for enhanced DFS block placement module 600 of FIG. 6 are described below.

Block Placement Request 650: In an aspect, when a DFS client sends a request to the file manager node of the cluster to create a DFS file block, block placement request 650 is also sent to enhanced DFS block placement module 600 from the file manager node. Block placement request 650 includes information related to the request, including at least one or more of the following:
- Information of the client for which the DFS file block is created;
- The computer from which the request is initiated; and
- Information of the file for which the DFS file block is created (file block size, replication factor, etc.).

Cluster Topology 660: In an aspect, enhanced DFS block placement module 600 may obtain cluster topology 660 from a SDN controller (or management system or another source) and the file manager node of the cluster. The topology may be a map of the cluster and may contain information describing the computers and switches of the cluster and their interconnection via a network. In an aspect, at least one or more of the following information may be gathered for each computer in the cluster:
- Computer ID;
- Hardware configuration (number of processors/cores, type and size of memory, type and size of storage, number of network ports);
- Software configuration (OS version, Java version, DFS version, etc.); and
- Power consumption information (Joules per million instructions per second (MIPS), Watts per million floating point operations per second (MFLOPS), etc.)

Each computer in the cluster is connected to the network with one or more network ports. For each network port on each computer, at least one or more of the following information may be obtained:
- Port ID;
- MAC address;
- IP address;
- Port capabilities (speed, duplex, etc.);
- Port status (activated, deactivated, etc.); and
- Connection information (ID of the peer network device and the ID of corresponding port on the peer network device).

For each network node (e.g., switch or router), at least one or more of the following information may be obtained:
- Network node ID;
- Network node type (ToR switch, core switch, etc.);
- Capabilities (number of ports, OpenFlow support, etc.); and
- Power consumption information (average/maximum/idle power consumption, etc.).

For each port of all the network nodes, at least one or more of the following information may be obtained:
- Port ID;
- Port capabilities (speed, duplex, etc.);
- Port status (activated, deactivated, etc.); and
- Connection information (ID of the peer computer or network node and the ID of corresponding port on the peer computer or network node).

Based upon the above information, a map of the nodes and connections may be established. The resulting cluster topology can be maintained in various forms such as tables, databases, etc. Various methods to discover the topology of the cluster and network can be used. The file manager node can get the computer hardware/software configuration information and power consumption information from the storage node process that runs on each computer. In an aspect, the SDN controller may discover the addresses of the computers in the cluster by observing the traffic generated by the computers. For example, a SDN controller can program all of the ToR switches so that all address resolution protocol (ARP) and dynamic host configuration protocol (DHCP) packets generated by the computers are copied by the ToR switches to the SDN controller. With all the ARP and DHCP messages received, the SDN controller can discover the MAC address and IP address of all the computers as well as the ToR switches and the switches' ports to which the computers are connected. The SDN controller can program all of the ToR switches and core switches to use Link Layer Discover Protocol to discover how the ToR switches and core switches are interconnected. Some or all of this information can be used to generate cluster topology 660 which is input to enhanced DFS block placement module 600.

Network Status 670: The network status is information describing the current state of the cluster network. The network status may include at least one or more of the following information for each network port in each network node:

Throughput, latency and jitter;
% capacity utilization;
Queue length and quantity of discarded frames; and
The active traffic flows and their configuration and status.

A traffic flow in a network node identifies a sequence of packets from a source port to a destination port. A traffic flow in a network node usually identifies all the packets generated by a user application such as a DFS file import utility operating on the network node. A user application usually generates many traffic flows in multiple networks nodes. For example, when a file is imported to the DFS, the DFS file import utility creates many DFS file blocks in the cluster. A file block replication pipeline is recreated to replicate each block. Two traffic flows are created on all the network nodes connecting the storage nodes in the pipeline, one for each direction of the traffic on the pipeline. For each active traffic flow in each network node, at least one or more of the following configuration and status information may be obtained:

Traffic flow ID;
Ingress port ID;
Egress port ID;
Customer ID (e.g., the ID of the customer for whom the traffic flow is created);
Customer Job ID (e.g., the ID of the customer's MapReduce Job);
Customer Task ID (e.g., the ID of the customer's MapReduce Tasks);
Capacity reservation (e.g., how much bandwidth is reserved for the traffic flow);
Utilization of the network connection (e.g., the percent of bandwidth of the network connection used by the flow);
Queue length (e.g., how many packets are queued for processing); and
Average latency.

In an aspect, the above configuration and status information may be collected from an SDN controller, such as SDN controller 190 of FIG. 1, which may track this information using the OpenFlow protocol. The SDN controller can query the network nodes for network status information as needed, and can also instruct the network nodes to report their status information to the SDN controller proactively. For example, a network node can be programmed to report its status periodically. Alternatively, a network node can be programmed to report its current status when its status has changed by a certain threshold amount compared with its last report status.

Storage Status 680: The storage status includes information about the current storage state of all of the computers in the cluster. At least one or more of the following information is obtained for each computer:

Total size of the storage devices (e.g., HDD); and
The amount of storage used.

an aspect, the DFS file manager node obtains storage space utilization information based on the storage node configuration information and the storage node status information provided in the heartbeat (periodic) messages and block report messages sent by each of the storage nodes in the cluster.

Processing Status 690: The processing status is the information about the jobs currently performed by all the computers in the cluster. At least one or more of the following information is maintained and provided in the Processing Status for each job performed in the cluster:

Job ID;
Job type (e.g., blocks replication, map task, reduce task, etc.);
Customer ID (e.g., the ID of the customer for whom the job and task is performed);
The IDs of the network nodes used to support the job;
The IDs of the computers used to process the job;
The network connections used to support the job; and
The QoS/SLA targets and guarantees provided to the job (e.g., reserved network capacity, delay budget, network processing priority, block replication time per GB, etc.).

On each computer, at least one or more of the following information is maintained and provided in the Processing Status:

The number of CPUs or processor cores installed;
Overall CPU utilization (e.g., the percentage of CPUs currently used);
Job IDs (e.g., all the jobs currently processed by the computer); and
CPU utilization per job.

In an aspect, the Processing Status information can be gathered from the DFS file manager node and from the process monitor.

SLA Policy/QoS requirements 610: In an aspect, through virtualization, multiple virtual DFS clusters can be created on the same cluster of physical computers in a data center. The Service Level Agreement (SLA) Policy/QoS describes how traffic for different users will be queued and processed by the network and describes the performance guarantees promised to different users. Accordingly, a data center operator may offer different service levels, possibly described by an SLA with certain QoS targets, to account for different user needs and budgets. For example, a Bronze SLA level user may purchase the services of a virtual DFS cluster with a best effort type of service that does not have any QoS guarantee, a Silver SLA level user may use the services of a virtual DFS cluster with prioritized traffic processing but without any QoS performance guarantee, and a Gold SLA level user may use a virtual DFS cluster with guaranteed network throughput, latency and jitter QoS performance guarantees at a higher monetary cost. In an aspect, the table below describes an alternative example where different service level agreements (SLAs) are guaranteed with different QoS targets and different processing priorities guaranteed.

TABLE 1

SLA Policy/QoS Parameters Example

| Service Level (SLA) | Throughput | Packet Loss | Packet Delay | Processing Priority |
|---|---|---|---|---|
| Gold | >=100 Mbps | <=0.0001% | <=2 ms | High |
| Silver | >=10 Mbps | <=0.01% | <=5 ms | Medium |
| Bronze | >=5 Mbps | <=1% | <=10 ms | Low |

Block Placement Policy 620: In an aspect, the block placement policy includes a set of rules specifying how many replicas of a DFS block should be created and where the replicas of the block may be placed. In one example, a default block placement policy may specify that three replicas of a block should be placed in at least two different racks of the cluster and that two of the three replicas should be located in the same rack. In another example, a block placement policy may specify that five replicas of a block be placed in at least three racks and that at least two replicas should be placed in the same rack.

Returning to FIG. 6, the enhanced DFS block placement module 600 generates two outputs, Placement Decision 630 and Network Control 640. Placement Decision 630 indicates a sequence of storage nodes where the block should be replicated. For a block in a file configured with a replication factor R, Placement Decision 630 is a sequence of R computer IDs (storage nodes $N_1, N_2, \ldots N_R$) in which each computer ID identifies a storage node in the cluster. The generation of Placement Decision 630 by enhanced DFS block placement module 600 is discussed in more detail below.

In an aspect, Network Control 640 includes instructions for the SDN controller to prepare the cluster network for the traffic that will be generated for transferring and storing blocks according to the block replication pipeline specified in the Placement Decision. For example, Network Control 640 may include instructions for the SDN controller to create flow entries in the network nodes so that the used block replication network traffic is transported in one or more network paths that avoid congested network segments. Alternatively, Network Control 640 may include instructions for the SDN controller to assign or adjust the priority of a traffic flow associated with the replication of a DFS file block. In another example, the Network Control 640 can include instructions for the SDN controller to activate and optionally reserve additional network capacity by aggregating a new network connection between a top of rack (ToR) switch and a core switch to avoid potential congestion that might be caused by used block replication traffic. Additional network capacity may be provisioned, for example, using the Link Aggregation Control Protocol (LACP, as defined in IEEE 802.1ax) between two nodes. Network capacity may be reserved for the upcoming transfer using for example, the Resource Reservation Protocol (RSVP) or Resource Reservation Protocol-Traffic Engineering (RSVP-TE) protocols.

In an aspect, network capacity may be reserved using explicit traffic policing algorithms in SDN enabled network nodes. For example, in a SDN enabled network node that supports OpenFlow Spec. 1.3, a meter table with ID meter_id can be created to drop any packet after the data rate exceeds a threshold. Additionally a flow entry with an instruction "Meter meter_id" can be added to the flow table to match each direction of the TCP traffic generated by the file block replication pipeline. The new flow entry and meter table together may effectively limit the bandwidth available to the file block replication traffic flow. Network capacity may be effectively reserved by: (a) enforcing bandwidth limits for all of the traffic flows; and (b) making sure the total bandwidth limit of all the traffic flows in each network node does not exceed the total output bandwidth for egress network connection.

Figure 7:
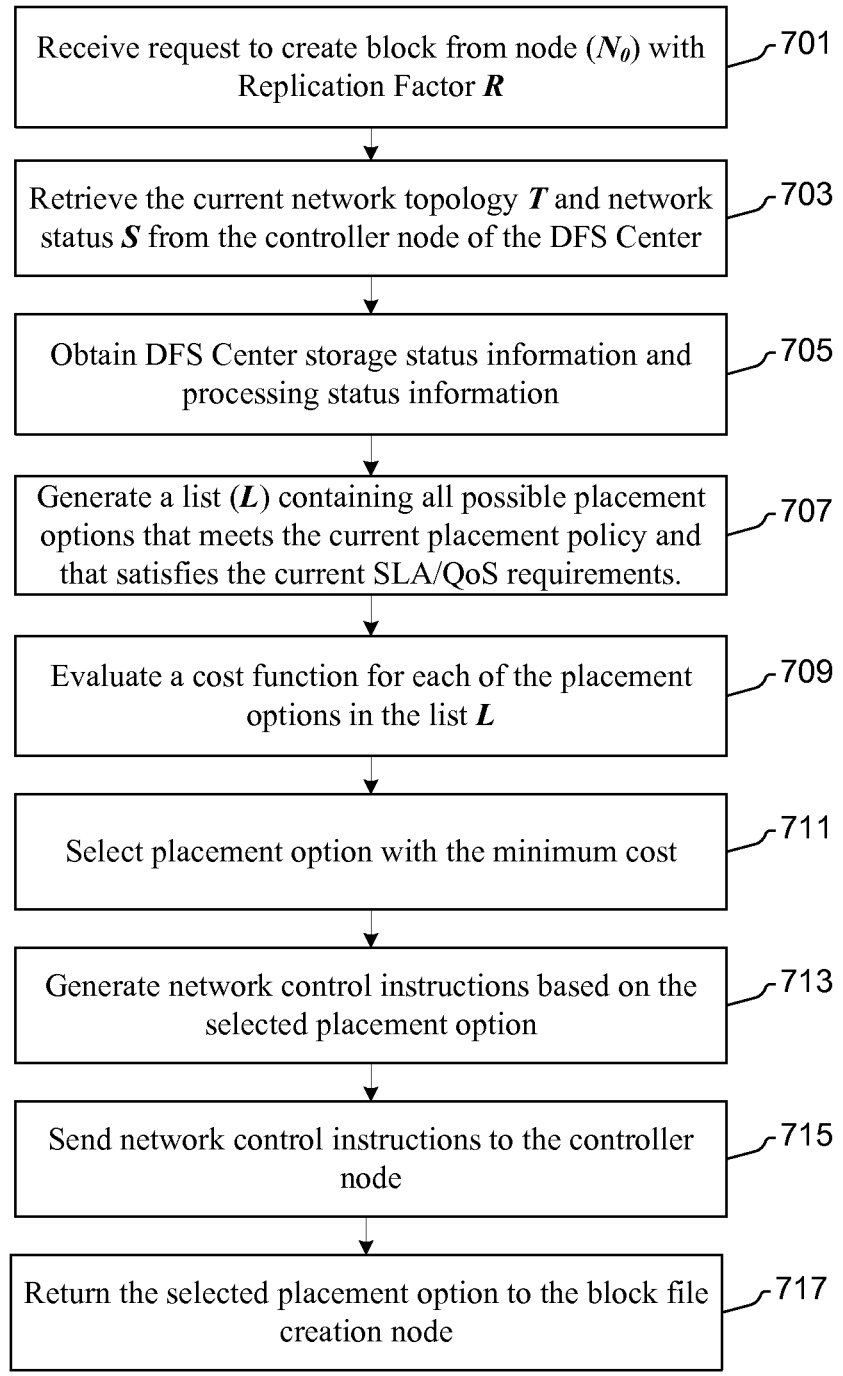
FIG. 7 is a flowchart depicting an enhanced block placement algorithm in accordance with aspects of the disclosure.

FIG. 7 is a flowchart depicting an enhanced block placement algorithm in accordance with aspects of the disclosure. An example of the generation of Placement Decision 630 by enhanced DFS block placement module 600 is now discussed in more detail with regard to FIG. 7. In step 701 of FIG. 7, a DFS client sends a new block request to the file manager node to create a new file block. In an aspect, the request may be from a DFS utility that imports a large file from outside of the cluster. In an aspect, the client may also be a data processing task (e.g., MapReduce task in Hadoop) that requests to write the processing output to a file in the DFS. The request to create a new block may be for the first block of a file, or for a new block to be appended to an existing file. In an aspect, the file manager node then sends a block placement request to the enhanced DFS block placement module, in which the block placement request includes the following information: the ID of the customer, the node ID No of the client, the size of the file block and the replication factor (R) of the file. The file manager node may determine this information from the new block request it received from the DFS client.

In step 703, the enhanced DFS block placement module retrieves the network topology and real time network status from, for example, the SDN controller of the cluster or from one or more other sources of network information in the cluster (e.g., a network or element management system). In an aspect, the enhanced DFS block placement module may obtain this information in real time when the client requests the creation of a block. In another aspect, the enhanced DFS block placement module may request this information from the SDN controller periodically and then use the last updated network topology and network status when the client requests the creation of a block. In another aspect, the SDN controller may send this information to the enhanced DFS block placement module periodically or at a time when the network topology or network status changes. For example a node addition or removal in the cluster may trigger the SDN controller to send an updated topology to the enhanced DFS block placement module. Similarly, the determination that a bandwidth utilization of a network link crosses a threshold (e.g., >95% utilized for >1 minute) may trigger a network status update. Hybrid solutions also may be used. For example, the network topology may be sent by the SDN controller only when network topology changes are made, but the network status may be queried by the enhanced DFS block placement module as used. With the network topology and real time network status, the enhanced DFS block placement module can evaluate and compare different block placement options.

In step 705, the enhanced DFS block placement module obtains the current storage status and processing status from the file manager node and from the process monitor of the cluster. In other aspects, the enhanced DFS block placement module may obtain the current storage status and processing status directly from each computer in the cluster.

Next, in step 707, the enhanced DFS block placement module generates a list L of possible block placement options that satisfies the current placement policy and the SLA/QoS requirements for the user. A block placement option indicates the R computers in which to store the block replicas and indicates the networking nodes and their network ports to be used to transport the block replication traffic.

In one aspect, the enhanced DFS block placement module may first generate a list $L_A$ of all possible block placement options using graphs. The network topology can be used to create a graph using all of the computers and network nodes as graph vertices and the network connections of the cluster as graph edges. Every path connecting the client node and R computers in the graph is a possible block placement option. For example, with reference to the block replication placement shown in FIG. 4, a possible path (Path1) is formed by connecting the following computers and network nodes in the order shown below:

Client;
ToR switch 3;
Core switch 1;
ToR switch 1;
Storage node 1;
ToR switch 1;
Core switch 1;
ToR switch 2;
Storage node 4;
ToR switch 2; and
Storage node 5.

A different path (Path2) with the same 3 storage nodes above can be formed by using core switch 2 instead of core switch 1 in the order shown below:

Client;
ToR switch 3;
Core switch 2;
ToR switch 1;
Storage node 1;
ToR switch 1;
Core switch 2;
ToR switch 2;
Storage node 4;
ToR switch 2; and
Storage node 5.

Path1 and Path2 in the above example are both possible block placement options. All of the possible block placement options in a graph can be created using known graph traversal algorithms.

From the list $L_A$ of all possible block placement options the enhanced DFS block placement module removes those options that are not consistent with the block placement policy, resulting in list $L_P$. For example, if the block placement policy requires that the replicas of a block be placed in at least two racks, the options that contain all of the R computers in a single rack will be removed. In another example, if the block placement policy requires that the replicas of a block be placed in at least three racks, then all the options that contain all of the R computers in a single rack or in only two racks will be removed.

In an aspect, the block placement options that are not consistent with block placement policy can also be excluded from the list of all possible block placement options as it is being generated. For example, if the list of all possible block placement options is being created using a graph traversal algorithm and the block placement policy requires that the replicas of a block be placed in at least two racks, and the current path being traversed already includes two computer nodes in a single rack, the graph traversal algorithm can remove all other computers in the same rack from its set of computer nodes to be traversed, and as a result the graph traversal algorithm generates a list of placement options that are consistent with the block placement policy.

The enhanced DFS block placement module next removes from $L_P$ those block placement options that would cause any user's SLA Policy/QoS guarantee to be violated if the DFS file block is replicated through the network path described by that block placement option, resulting in list L. For each block placement option, the enhanced DFS block placement module examines the network status on all network nodes to be used in the block placement option, and determines if the SLA policy/QoS guarantee for any current traffic flow in any network node would be violated. If the SLA policy/QoS guarantee for any current traffic flow would be violated on any network node by replicating the DFS file block through the network path, the block placement option will be removed. For example, referring to the block placement depicted in FIG. 4, the network status for ToR switch 3, core switch 1, ToR switch 1, ToR switch 2 will be examined for the block placement option Path1 described earlier. On each of these network nodes, the network status information will provide detailed information on each traffic flow along the network path. For example, ToR switch 1 may contain network status information such as the following:

TABLE 2

Network Status in ToR switch 1

| Traffic Flow ID | Ingress Port | Egress Port | Customer ID | Job ID | Bandwidth Reserved |
|---|---|---|---|---|---|
| FLOW_1 | 1 | 10 | CustomerA | JOB_X | 100 Mbps |
| FLOW_2 | 2 | 10 | CustomerB | JOB_Y | 200 Mbps |
| FLOW_3 | 3 | 10 | CustomerC | JOB_Z | 400 Mbps |

In Table 2 above, port 1, 2 and 3 of ToR switch 1 are the ports that connect to storage node 1, 2 and 3 respectively, and port 10 of ToR switch 1 is the port that connects to Core Switch 1. In this example, CustomerA, CustomerB and CustomerC have services with different SLA policy/QoS guarantees, and as a result the traffic flows FLOW_1, FLOW_2 and FLOW_3 are guaranteed 100 Mbps, 200 Mbps, and 400 Mbps of bandwidth on egress port 10, respectively. Since placement option Path1 requires replicating the block from storage node 1 to storage node 4, a new traffic flow from port 1 to port 1 will need to be added in ToR switch 1, and the new traffic flow will only have a maximum of 300 Mbps available if the egress port can only support a maximum of 1 Gbps. If the SLA policy/QoS guarantee for the current customer requires 400 Mbps reserved bandwidth, placement option Path1 will be removed because it would violate the current customer's SLA/QoS guarantees. In an aspect, a placement option that would violate the current customer's SLA/QoS guarantees is marked as inadequate and, in the case that all placement options are marked inadequate, the placement option that least violates the current customer's SLA/QoS guarantees may be selected.

In an aspect, the block placement options that would cause any user's SLA Policy/QoS guarantee to be violated can also be excluded from the list of all possible block placement options as it is being generated. For example, when the list of all possible block placement options is created using a graph traversal algorithm, the enhanced DFS block placement module examines the network status for each of the network nodes to be traversed from the current network path, and determines if the SLA policy/QoS guarantee for any current traffic flow in the network node would be violated. If the SLA policy/QoS guarantee for any current traffic flow would be violated, the network node is removed from the set of nodes to be traversed. As a result the graph traversal algorithm generates a list of placement options that would not violate any user's SLA Policy/QoS guarantee.

It should be appreciated that the order of the above-described sub-steps associated with step 707 may be changed. For example, the block placement options that violate users' SLA policy and/or QoS guarantee requirements can be removed first, and then the block placement options that violate the block placement policy can be removed. In an aspect, some or all of the sub-steps may be combined with subsequent steps in the process. Similarly, some of the sub-steps may be eliminated, such as the filtering of the list of block placement options by SLA and/or QoS. In addition, it should be appreciated that other algorithms can be utilized in enhanced DFS block placement module for generating a list L of block placement options. In an aspect, enhanced DFS block placement module may generate only a partial list L of block placement options, or enhanced DFS block placement module may generate a truncated list L of block placement options by stopping after a fixed or variable time interval before all possible block placement options are generated. In an aspect, the functions of steps 707 and 709 (discussed in detail below) may be combined such that a cost function is evaluated to determine a cost valuation parameter for each possible placement option before it is placed in the list L and if the cost valuation parameter for that possible placement option exceeds a threshold then the possible placement option is not included in the list L. Otherwise, the possible placement option is included in the list L if it also satisfies the current block placement policy and the current SLA/QoS requirements.

In step 709, the enhanced DFS block placement module evaluates a cost function to determine a cost valuation parameter for each of the block placement options in the list generated in step 707. A cost function cost( ) is defined so that the enhanced DFS block placement module can evaluate and rank different block placement options quantitatively in order to maximize performance. Performance, in this context, may refer to one or more block placement service characteristics such as placement speed, reliability, repeatability and effect of the placement on the cluster. For a cluster of N nodes with each node assigned a unique ID, the inputs to the cost function may include one or more of the following items:

Block Placement Request (BPR): The block placement request received from the file manager node;

Current placement option (CPO): The placement option to be evaluated. The placement option includes the ID of the client node ($N_O$), the R computers nodes, the network nodes and their network ports that are used to transport the block replication traffic. The R computer nodes can be denoted as ($I_1, I_2, \ldots, I_R$) where $I_1$ is the ID of the first computer node of the block placement option, $I_2$ is the ID of the second computer node, ..., and $I_R$ is the ID of the last computer node;

Cluster topology (CT);

Network status (NS); and

Storage status (SS) and processing status (PS).

The cost function cost( ) returns a quantitative value (a cost valuation parameter) indicating the cost of replicating the block for the current customer according to the current placement option being considered. The returned cost valuation parameter may be calculated via a summation of the three terms as shown below.

$$\text{cost}(BPR,CPO,CT,NS,SS,PS) = \text{weight}_{network} \times \text{cost}_{network}(BPR,CPO,CT,NS,SS,PS) + \text{weight}_{storage} \times \text{cost}_{storage}(BPR,CPO,CT,NS,SS,PS) + \text{weight}_{processing} \times \text{cost}_{processing}(BPR,CPO,CT,NS,SS,PS)$$

Where $\text{cost}_{network}$, $\text{cost}_{storage}$ and $\text{cost}_{processing}$ indicate the network cost, storage cost and processing cost associated with replicating the block, and $\text{weight}_{network}$, $\text{weight}_{storage}$ and $\text{weight}_{processing}$ are coefficients that can be used to adjust how the network cost, storage cost and processing cost contribute to the output of the cost function cost( ). Different functions for $\text{cost}_{network}$, $\text{cost}_{storage}$ and $\text{cost}_{processing}$ may be defined so that cost( ) may indicate any combination of the network cost, storage cost and/or processing cost. For example, cost storage and $\text{cost}_{processing}$ may be defined to always return 0 so that cost( ) only includes the network cost, $\text{cost}_{network}$ associated with the current block placement option. In another example, $\text{cost}_{network}$ and $\text{cost}_{processing}$ may be defined to always return 0 so that cost( ) only includes the storage cost, $\text{cost}_{storage}$, associated with the current block placement option.

Different functions for $\text{cost}_{network}$, $\text{cost}_{storage}$ and $\text{cost}_{processing}$ may be created or tuned to work, support different objectives. For example, if the objective is to minimize network traffic in the cluster, the output of $\text{cost}_{network}$ may be the number of network segments or links used to transfer the block replication traffic:

$$\text{cost}_{network}(BPR, CPO, CT, NS, SS, PS) = \text{hop\_count}(CPO)$$

where hop_count(CPO) returns the number of network hops used in the current block placement option (CPO) under consideration. In an aspect, as a variation of this example, if network traffic involving the core switches in the data center requires higher monetary cost than traffic involving ToR switches, the cost function can use a higher weight for traffic that would need to travel across the core network switches and lower weight for the traffic that would need to travel across the ToR switches.

In another aspect, the objective is to balance the storage utilization across the cluster, and so $\text{cost}_{storage}$ may be defined as:

$$\text{cost}_{storage}(BPR, CPO, CT, NS, SS, PS) = \sum_{i=1}^{R} \left| \frac{\text{storage\_used}(I_i)}{\text{total\_storage}(I_i)} - \text{average\_utilization}(CPO, SS) \right|$$

where average_utilization(CPO,SS) is the average storage utilization of all the computer nodes in the cluster, ($I_1, I_2, \ldots, I_R$) are the IDs of the R computer nodes in the current placement option, storage_used($I_i$) is the total amount of storage used in computer node $I_i$ and total_storage ($I_i$) is the total amount of storage installed in computer node $I_i$.

In another aspect, the placement objective is to minimize replication time, and so the output of $\text{cost}_{network}$ may be the time it takes to complete the placement of the block replicas. Since the block is replicated in a pipeline fashion, the block is transferred across all of the network hops as specified in the current block placement option. The time it takes to complete the block replication is the time it takes to transfer the block across the network hop with the lowest bandwidth available to the current customer. Accordingly, in this aspect, $\text{cost}_{network}$ may be defined as:

$$\mathrm{cost}_{network}(BPR, CPO, CT, NS, SS, PS) = \frac{\mathrm{block\_size}(BPR)}{\mathrm{lowest\_available\_bandwidth}(CPO)}$$

In which block_size(BPR)=the size of the current HDFS file block
lowest_available_bandwidth(CPO)=the lowest available bandwidth to the current customer on all the network hops used in the current block placement option.

In an aspect, the lowest available bandwidth may be obtained through the SDN services by retrieving network capacity reservation information via a SDN function call. In another aspect, the lowest available bandwidth may be obtained through the SDN services by retrieving average network percentage utilization information via a SDN function call. In another aspect, the lowest available bandwidth may be obtained from utilization of a network diagnostic probe from which available bandwidth information can be determined.

In a further aspect, the cost function may also be defined to minimize the energy consumption of the block replication associated with the block placement option. In this case, the cost functions $\mathrm{cost}_{network}$, $\mathrm{cost}_{storage}$ and $\mathrm{cost}_{processing}$ may be calculated by summing the amount of energy (e.g., Joules) or power (e.g., Watts) used to transfer, store and process the data block replicas associated with the current block placement option (CPO).

For example, $\mathrm{cost}_{network}$ may be a summation of the energy or power used per bit transferred by each port of each network node participating in the CPO. In another example, $\mathrm{cost}_{storage}$ may be a summation of the energy or power used per byte stored by each storage device (e.g., hard disk drive, solid state drive, etc.) participating in the CPO. Further, $\mathrm{cost}_{processing}$ may be a summation of the energy or power used per processing unit. For example, $\mathrm{cost}_{processing}$ may be defined in terms of Joules per million instructions per second (MIPS), or Watts per million floating point operations per second (MFLOPS).

In an aspect, the above energy/power information may be obtained from the device manufacturer and stored in each device or in the device's management system. In an aspect, the information may be provided to the enhanced DFS block placement module via the cluster topology input from an SDN controller, an element management system or an alternative management method.

In an another aspect, $\mathrm{cost}_{network}$ may be calculated by summing the average or maximum power consumption of the device(s) containing each network port used in the CPO, with an equation for network cost as follows:

$$\mathrm{cost}_{network} = \Sigma_{i=1}^{n} P_i$$

in which n=the number of network ports involved in the CPO, and $P_i$=the average or maximum power dissipation (e.g., Watts) of the device containing port i.

For example, consider two possible paths in which both paths traverse a total of 6 ports through two switches, as follows:

PathA: Computer 1 =>Switch 1 (Port 0)=>Switch 1 (Port 1)=>Switch 2 (Port 0)=>Switch 2 (Port 1)=>Computer 2

PathB: Computer 1 =>Switch 1' (Port 0)=>Switch 1' (Port 1)=>Switch 2' (Port 0)=>Switch 2' (Port 1)=>Computer 2

Further consider the following average power dissipation of each device:

Computer 1 100 Watts;
Computer 2 100 Watts;
Switch 1 100 Watts;
Switch 2 100 Watts;
Switch 1' 150 Watts;
Switch 2' 150 Watts; so that, using the equation above, the cost for PathA and PathB would be 600 and 800, respectively.

In another aspect, the network cost may be calculated as the sum of the average or maximum power consumption of the device(s) containing each network port, normalized by the number of device ports, as follows:

$$\mathrm{cost}_{network} = \Sigma_{i=1}^{n} P_i / \mathrm{numports}_i$$

in which $P_i$=the average or maximum power dissipation (e.g., Watts) of the device containing port i, and $\mathrm{numports}_i$=the number of network ports on device containing port i.

In another aspect, the cost function may be calculated by summing the incremental power consumed by each port used in the CPO. This may be calculated, for example, using the following equation:

in which:

$$\mathrm{cost}_{network} = \Sigma_{i=1}^{n} (P_{max,i} - P_{idle,i}) / \mathrm{numports}_i$$

$P_{max,i}$=the maximum power dissipation of the device containing port i (i.e. the power dissipation with all ports operating at full line rate);

$P_{idle,i}$=the idle power dissipation of the device containing port i (i.e. the power dissipation with all ports idle); and $\mathrm{numports}_i$=the number of network ports on the device containing port i.

Further, the cost function may be normalized based on port speed, as follows:

$$\mathrm{cost}_{network} = \sum_{i=1}^{n} (P_{max,i} - P_{idle,i}) / (\mathrm{numports}_i \times \mathrm{portspeed}_i)$$

in which:

$P_{max,i}$=the maximum power dissipation of the device containing port i (i.e. the power dissipation with all ports operating at full line rate);

$P_{idle,i}$=the idle power dissipation of the device containing port i (i.e. the power dissipation with all ports idle);

$\mathrm{numports}_i$=the number of network ports on the device containing port I; and $\mathrm{portspeed}_i$=the line rate of network port i, as measured, for example, in Gbps.

In an aspect, the idle, average and maximum power consumption specifications for devices in the cluster may be obtained from the device manufacturer and may be stored on a network device or within a network management system. These specifications may be provided to the enhanced DFS block placement module via the cluster topology input from an SDN controller, element management system or other management entity in the cluster. One skilled in the art will appreciate that the "device containing port i" may refer to various forms factors including but not limited to: rack mounted enclosure, network cards/blades, network modules, SFP (small form factor pluggable) and NIC (network interface card).

In another aspect, the objective is to balance the network utilization across the cluster, and so $cost_{network}$ may be defined as:

$$cost_{network}(BPR,CPO,CT,NS,SS,PS) = \Sigma_{i=1}^{n} weight(CT, L_i) \times |link\_utilization(L_i) - average\_network\_utilization(CT,NS)|$$

where: $(L_1, L_2, \ldots, L_n)$ are the network links used in the block replication pipeline for the current placement option; $link\_utilization(L_i)$ is the current bandwidth utilization of network link $L_i$; $average\_network\_utilization(CT,NS)$ is the average network utilization of all the network links in the cluster; and $weight(CT,L_i)$ is a coefficient for network link $L_i$. In this definition of $cost_{network}$, $weight(CT,L_i)$ allows different network links to contribute differently to the output of $cost_{network}$, depending on the location and/or type of network link $L_i$ in the cluster. For example, a first network link between a computer and a ToR switch and a second network link between a ToR switch and a core switch can each have a different weight and thereby contribute differently to the output of $cost_{network}$. In an aspect, link_utilization and average_network_utilization may be normalized by dividing current link utilization (e.g., in Mbps) by the maximum link capacity (e.g., the port speed in units of Mbps), thereby allowing a cost function to be evaluation for networks with different link speeds.

Figure 8:
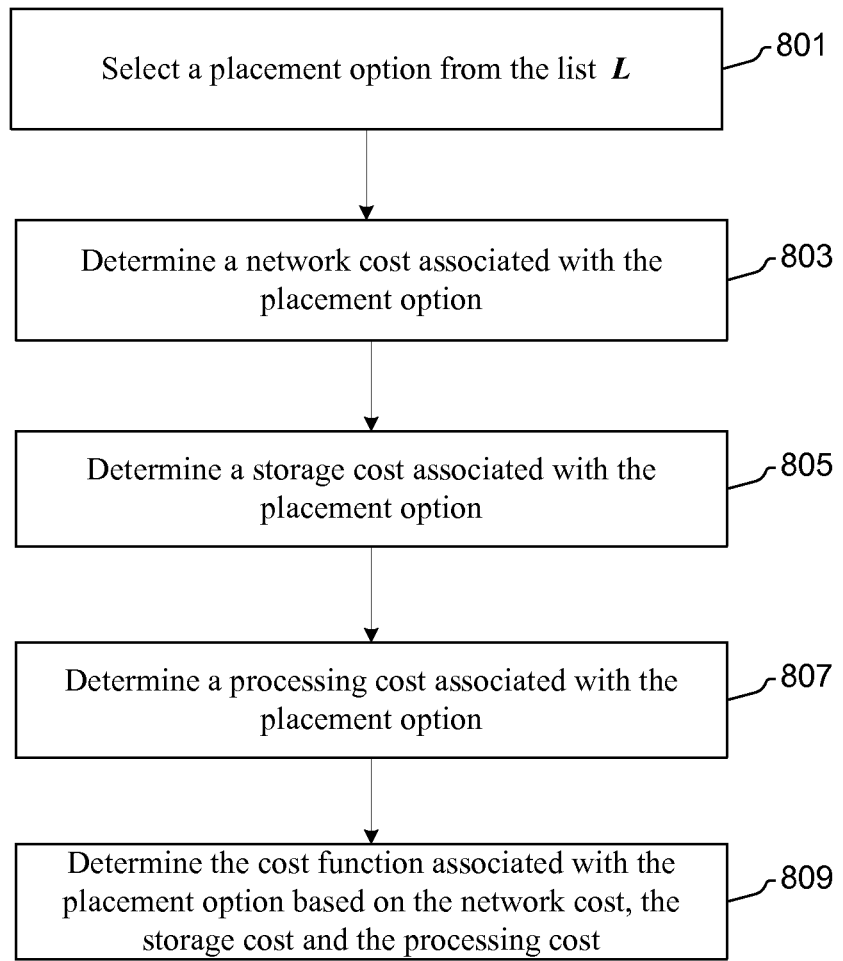
FIG. 8 is a flowchart depicting the determination of a cost function associated with a block placement option in accordance with aspects of the disclosure.

FIG. 8 is a flowchart depicting the determination of a cost function associated with a block placement option in accordance with aspects of the disclosure. FIG. 8 provides a summary of the sub-steps of step 709 of FIG. 7, as discussed above. In step 801, a block placement option is selected from the list of block placement options L. In an aspect, the block placement option may be selected from the list in order, or may be selected based on criteria such as the number of racks involved in the block placement option, etc. In step 803, a network cost, $network_{cost}$, as described above, is determined for the associated selected block placement option. A storage cost, $storage_{cost}$, as described above, is determined for the associated selected block placement option in step 805. In step 807, $processing_{cost}$, as described above, is determined for the associated selected block placement option. Lastly, a cost valuation parameter, cost( ), is determined in step 809 for the selected block placement option based on the determined $network_{cost}$, $storage_{cost}$, and $processing_{cost}$, as described above. It should be appreciated that the order of steps shown in FIG. 8 is exemplary, and the steps may be performed in other orders or combinations.

In an aspect, other inputs may be included in the calculation of the cost functions. For example, if the cost functions attempt to account for monetary cost that depends on when the block is replicated, the current time can be added as an input to the cost functions. Similarly, the cost function may extended to include the financial cost of using a particular hop (or network node port), because the operating cost of each device may differ, especially in a network which may have components managed by more than one service provider. In another aspect, different brands or models of network switches maybe be used together in the cluster network at the same time, and some brands or models of network switches may be less reliable than the others (due to brand reputation, well known benchmarks, observed performance, etc.), and it is preferable to use the more reliable network switches. The brand and model of the network switches and their reliability metrics may be included in the calculation of the cost function so that the cost of using less reliable network switches is higher, and the cost of using more reliable network switches is lower.

In an aspect, the $cost_{processing}$ may be determined based on processing capabilities associated with each processing unit which may be measured in MIPS, Megaflops, or another indicator of such processing capabilities. In an aspect, the $cost_{processing}$ may be determined based on the current utilization (before implementation of the placement option) of the processing capabilities associated with each processing unit, which may be reported by the operating system (OS) of the processing unit.

In an aspect, functions for $cost_{network}$, $cost_{storage}$ and $cost_{processing}$ may be created or tuned to support multiple objectives. Mathematical terms representing each objective may be weighted by a coefficient (set to reflect by each objective's relative importance) and then summed to form the final cost function (e.g., $cost_{network}$). For example, $cost_{network}$ may be calculated to include both the time it takes to complete the block replication and the sum of the average or maximum power consumption of the device(s) containing each network port used in the CPO. Such an equation for network cost is provided, as follows:

$$cost_{network}(BPR,CPO,CT,NS,SS,PS) = \\ weight_{network,time} \times cost_{network,time} + \\ weight_{network,power} \times cost_{network,power}$$

in which $$cost_{network,time} = \frac{block\_size(BPR)}{lowest\_available\_bandwidth(CPO)};$$

$$cost_{network,power} = \sum_{i=1}^{n} P_i;$$

$weight_{network,time}$=the weight or coefficient that controls how much $cost_{network,time}$ contributes to $cost_{network}$;
$weight_{network,power}$=the weight or coefficient that controls how much $cost_{network,power}$ contributes to $cost_{network}$;
$lowest\_available\_bandwidth(CPO)$=the lowest bandwidth available to the current customer on all the network hops used in the CPO;
$block\_size(BPR)$=the size of the current DFS file block;
n=the number of network ports involved in the CPO; and
$P_i$=the average or maximum power dissipation (e.g., Watts) of the device containing port i.

Of course, it should be appreciated that the above descriptions of evaluating a cost function to determine a cost valuation parameter associated with a block placement option are exemplary, and that other known cost function algorithms and models may be used as well.

Returning to FIG. 7, in step 711 the enhanced DFS block placement module selects the placement option with the lowest cost, based on the cost valuation parameters determined from the cost function evaluations in step 709. In an alternative aspect, the enhanced DFS block placement module may select the placement option with the lowest cost from the first N placement options that have a cost lower than a threshold. In an aspect, the placement options may be sorted by cost by using a sorting algorithm. Alternatively, status variables may be maintained to track the current minimum cost and the associated block placement option as the cost for each placement option is determined in step 709. As soon as the cost of a block placement option is determined to be higher than the current minimum cost, further cost calculation for the current placement option may be stopped. Then the cost of the next block placement option is determined in the same manner, resulting in the block placement option(s) with the lowest cost (or n lowest costs) being known at the completion of the cost determinations in step 709.

In step 713, the enhanced DFS block placement module generates network control instructions for the SDN controller to prepare the network for transfer of the block replicas for storage according to the selected block placement option from step 711. In an aspect, the network control instructions may be directed to an OAM or EMS system/device in the cluster. In an aspect, the enhanced DFS block placement module may generate network control instructions to direct the SDN controller to generate OpenFlow instructions for switches, routers or other devices in the network. In an aspect, the enhanced DFS block placement module may generate network control instructions to request the SDN controller to establish OpenFlow flow entries in the network nodes so that the block replication network traffic follows the specific path as defined by the selected block placement option. For example, if the selected block placement option is Path2 as described above in step 707, the enhanced DFS block placement module may generate network control instructions to request the SDN controller to set up flow entries in ToR switch 3, core switch 2, ToR switch 1, and ToR switch 2. In this example, flow entries in core switch 2 are established so that:

Block replication data packets from Client node through ToR switch 3 are forwarded to ToR switch 1;
Block replication confirmation packets from storage node 1 through ToR switch 1 are forwarded to ToR switch 3;
Block replication data packets from storage node 1 through ToR switch 1 are forwarded to ToR switch 2; and
Block replication confirmation packets from storage node 4 through ToR switch 2 are forwarded to ToR switch 1.

In an aspect, the enhanced DFS block placement module may update the stored network status information so that flow entries created in this step are included with the latest status information such as customer ID, job ID and other flow configuration and reservation information. In an aspect, the enhanced DFS block placement module may generate network control instructions to modify existing OpenFlow entries in different network nodes through the SDN controller in order to accommodate the incoming block replication traffic. The enhanced DFS block placement module may generate network control instructions to modify processing priorities of existing traffic flows in different network nodes. For example, when a new block replication is requested from a client with higher service level, and there exist other traffic flows being processed for clients with a lower service level, the enhanced DFS block placement module may generate network control instructions to decrease the priorities for the existing traffic flows so that the traffic for the new block replication receives prioritized processing.

In an aspect, the enhanced DFS block placement module may modify other QoS parameters such as bandwidth reservations on existing traffic flows so that the traffic flow for the new block replication can be assigned appropriate QoS parameters. For example, if a new traffic flow from port 4 to port 10 needs to be created for CustomerD in the ToR switch 1 as shown above in Table 2, and the new traffic flow must be reserved at a bandwidth of 400 Mbps, and according to CustomerC's SLA Policy/QoS guarantee the bandwidth reserved for FLOW 3 can be reduced to 300 Mbps, the enhanced DFS block placement module may create a new traffic flow FLOW_4 for CustomerD and at the same time modify traffic flow FLOW_3 to reduce its bandwidth reservation from 400 Mbps to 300 Mbps. The table below shows the modified existing traffic flow FLOW_3 and the new traffic flow FLOW_4 for this example.

TABLE 3

Adding New Flow and Modifying Existing Flow in ToR Switch 1

| Traffic Flow ID | Ingress Port | Egress Port | Customer ID | Job ID | Bandwidth Reserved |
|---|---|---|---|---|---|
| FLOW_1 | 1 | 10 | CustomerA | JOB_X | 100 Mbps |
| FLOW_2 | 2 | 10 | CustomerB | JOB_Y | 200 Mbps |
| FLOW_3 | 3 | 10 | CustomerC | JOB_Z | 300 Mbps |
| FLOW_4 | 4 | 10 | CustomerD | JOB_D | 400 Mbps |

In an aspect, the enhanced DFS block placement module may also reconfigure the network for efficient accommodation of traffic associated with the selected placement option. For example, the enhanced DFS block placement module may generate network instructions to reconfigure how the ToR switches are connected to the core switches. Typically, a ToR switch is connected to a core switch through multiple network connections and those networks connections can be aggregated as multiple trunk groups. Network traffic from/to different computer nodes or different customers can be directed to different truck groups. In an aspect, the enhanced DFS block placement module may generate network instructions to dynamically adjust how many network connections will be aggregated in each trunk group in order to increase/decrease the link capacity of each trunk group.

Figures 9A, 9B:
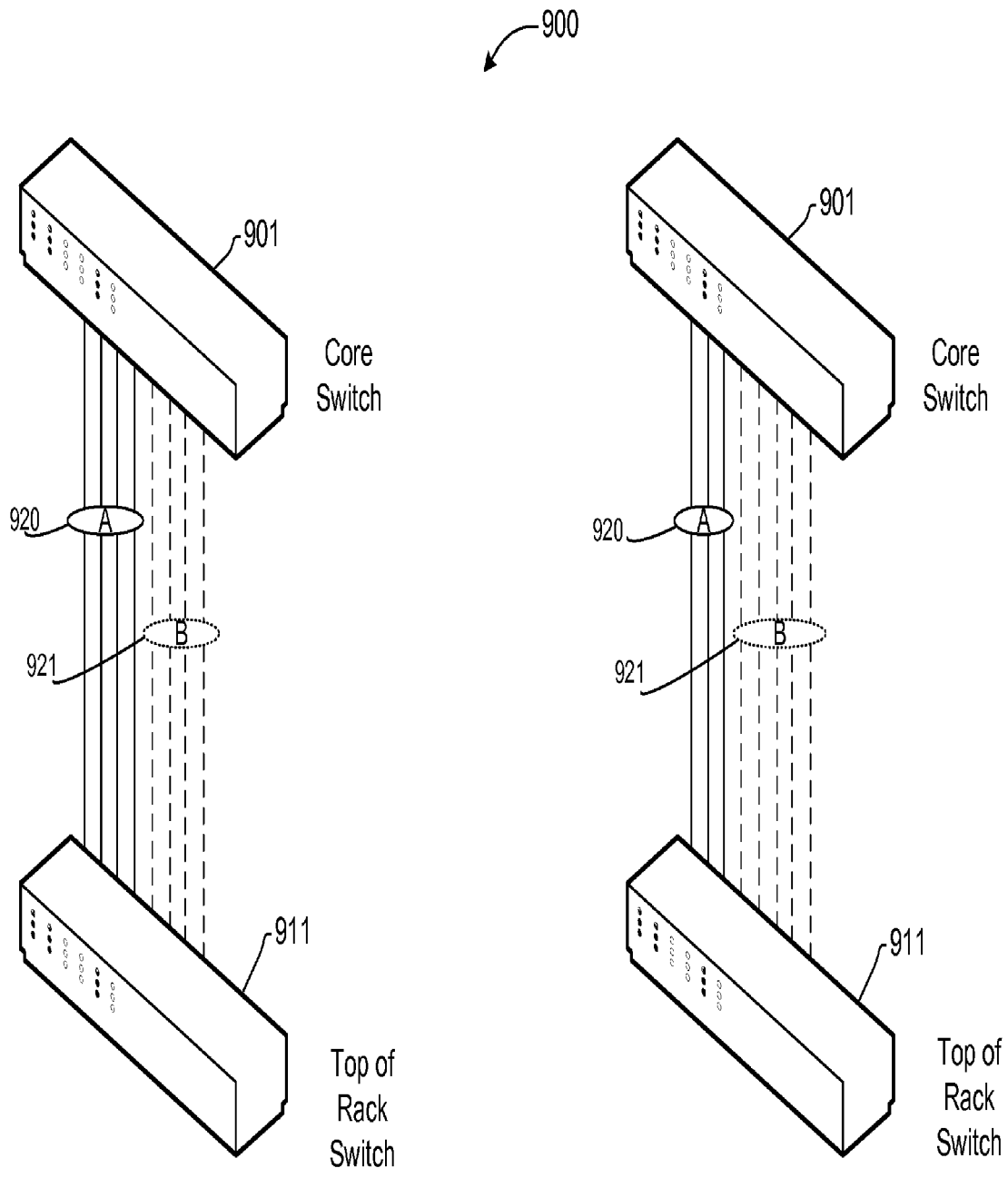
FIGS. 9A and 9B are block diagrams depicting reconfiguration of network connections between a core switch and a top of rack switch in accordance with aspects of the disclosure.

In an aspect, the enhanced DFS block placement module may generate network instructions to move a network connection from an underutilized trunk group to a heavily utilized trunk group in order to increase the link capacity in the heavily utilized trunk group. FIGS. 9A and 9B are block diagrams depicting reconfiguration of network connections between a core switch and a top of rack switch in accordance with aspects of the disclosure. FIGS. 9A and 9B show a cluster 900 which may be, for example, in the distributed file system network of FIG. 1. Cluster 900 includes a ToR switch 911 is connected to a core switch 901 through 8 Gigabit Ethernet connections, and the 8 connections are configured as trunk group A 920 and trunk group B 921. In FIG. 9A, trunk group A and trunk group B each include 4 Gigabit Ethernet connections each providing a link capacity of 4 Gbps. When the enhanced DFS block placement module determines that the link capacity of trunk group B should be increased to 5 Gbps and trunk group A currently utilizes 3 Gbps or less, the enhanced DFS block placement module reconfigures the network as shown in FIG. 9B in which trunk group A 920 has lost one Ethernet connection and trunk group B 921 has added one Ethernet connection.

Returning to FIG. 7, as described above with regard to step 713, the network control instruction set may configure or modify different elements in the cluster, and/or different performance characteristics associated with different elements, traffic and users of the cluster. It should be appreciated that the descriptions of network instructions provided herein are exemplary, and that such instructions may be performed in other orders or combinations.

In step 715 the enhanced DFS block placement module sends the determined network control instructions to the controller node, which may be an SDN controller or may be an OAM or EMS system/device operating in, or in connection with, the cluster. In this manner, the controller node may operate on the instructions and configure the network accordingly to accommodate the network traffic associated with the selected block placement option. In step 717, the enhanced DFS block placement module returns the sequence of computer nodes (storage nodes) specified in the selected block placement option to the file manager node, and the file manager node then returns the sequence as the block placement decision to the DFS client that initiated the request for a new block to the file manager node.

In aspects described above, the enhanced DFS block placement module executes the steps of FIG. 7 every time a new file block is requested. In another aspect, the enhanced DFS block placement module may be executed for multiple new file blocks at a time, or even for all file blocks of an entire new file at a time. For example, when a DFS client imports a file from a different file system to DFS, it knows the size of the original file and therefore the number of blocks that need to be created and replicated to the DFS cluster. The DFS client may provide the size information to the enhanced DFS block placement module which uses the steps described above to determine and store the selected block placement option for each of the blocks all at once.

In an aspect, the selected block placement option can be returned to the DFS client and the corresponding network controls can be sent to the SDN controller for each block as it is created and replicated. In another aspect, the enhanced DFS block placement module may use the steps described above to determine and return the selected block placement option to the DFS client and to send network control instructions to the SDN controller for a number of blocks at a time, and the number of blocks may be determined by the DFS client or by the enhanced DFS block placement module in accordance with its configuration and/or the configuration and/or the real time status of the cluster network.

The foregoing systems and methods and associated devices and modules are susceptible to many variations. Additionally, for clarity and concision, many descriptions of the systems and methods have been simplified. For example, the figures generally illustrate one of each type of network device, but a network system may have many of each type of device.

As described in this specification, various systems and methods are described as working to optimize particular parameters, functions, or operations. This use of the term optimize does not necessarily mean optimize in an abstract theoretical or global sense. Rather, the systems and methods may work to improve performance using algorithms that are expected to improve performance in at least many common cases. For example, the systems and methods may work to optimize performance judged by particular functions or criteria. Similar terms like minimize or maximize are used in a like manner.

Those of skill will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the disclosure. In addition, the grouping of functions within a unit, module, block, or step is for ease of description. Specific functions or steps can be moved from one unit, module, or block without departing from the disclosure.

The various illustrative logical blocks, units, steps and modules described in connection with the embodiments disclosed herein can be implemented or performed with a processor, such as a general purpose processor, a multi-core processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC. Additionally, device, blocks, or modules that are described as coupled may be coupled via intermediary device, blocks, or modules. Similarly, a first device may be described a transmitting data to (or receiving from) a second device when there are intermediary devices that couple the first and second device and also when the first device is unaware of the ultimate destination of the data.

The above description of the disclosed embodiments is provided to enable any person skilled in the art to make or use the disclosure. Various modifications to these embodiments will be readily apparent to those skilled in the art, and the generic principles described herein can be applied to other embodiments without departing from the spirit or scope of the disclosure. Thus, it is to be understood that the description and drawings presented herein represent a presently preferred embodiment of the disclosure and are therefore representative of the subject matter that is broadly contemplated by the present disclosure. It is further understood that the scope of the present disclosure fully encompasses other embodiments that may become obvious to those skilled in the art and that the scope of the present disclosure is accordingly limited by nothing other than the appended claims.

What is claimed is:

1. A method used by a file manager node which performs file block placement in a distributed file system network that includes a plurality of network nodes and comprises a transceiver and a processor, the method comprising:

receiving, by using the transceiver, a file block request which comprises a replication factor to create a file block in the distributed file system network, wherein the replication factor indicates how many of the data storage nodes are required to store a replica of the file block;

generating, by the processor, a file block placement option for placing the file block in at least one data storage nodes in the distributed file system network in response to receiving the file block request, wherein generating the file block placement option by the processor comprising:
    generating a list of file block placement options;
    calculating a cost function equation for each of the file block placement options based on variables of the cost function equation which are being evaluated in real time and consisting essentially of a block placement request (BPR), a current placement option (CPO), a cluster topology (CT), a network status (NS), a storage status (SS), and a processing status (PS) so as to calculate a cost valuation parameter from the cost function equation; and
    selecting the file block placement option having a minimum cost valuation parameter among the file block placement options;
generating, by the processor, a network control instruction set based at least in part on the file block placement option; and
sending, by using the transceiver, the network control instruction set to a controller node in communication with the distributed file system network for the controller node to carry out the selected file placement option according to the network control instruction.

2. The method of claim 1, wherein each of the BPR, CPO, CT, NS, SS, and PS are multiplied by a respective weight.

3. The method of claim 1, wherein calculating the cost function equation for each of the file block placement options based on BPR, CPO, CT, NS, SS, and PS comprising:
    calculating the cost function equation for each of the file block placement options based on BPR, CPO, CT, NS, SS, and PS to determine a hop count for the CPO.

4. The method of claim 3, wherein calculating the cost function equation for each of the file block placement options based on BPR, CPO, CT, NS, SS, and PS comprising:
    calculating the cost function equation for each of the file block placement options based on BPR, CPO, CT, NS, SS, and PS to determine a storage utilization rate of a network node.

5. The method of claim 1, wherein the network control instruction set includes an instruction for the controller node to enable routing of the file block to the at least one data storage nodes.

6. The method of claim 5, wherein the controller node enables routing of the file block to the at least one data storage nodes by sending a new flow entry command to at least one of the plurality of network nodes.

7. The method of claim 5, wherein the controller node enables routing of the file block to the at least one data storage nodes by reconfiguring an existing network connection between two or more of the plurality of network nodes.

8. The method of claim 5, wherein the controller node enables routing of the file block to the at least one data storage nodes by applying a data traffic policing algorithm to at least one of the plurality of network nodes.

9. The method of claim 1, wherein the network control instruction set includes an instruction to adjust a bandwidth reservation for an existing network traffic flow.

10. A computing device having a file managing capability to determine a file block placement in a distributed file system network that includes a plurality of network nodes, the computing device comprising:
    a transceiver;
    a memory configured to store data and processing instructions; and
    a processor configured to retrieve and execute the processing instructions stored in the memory to cause the processor to perform functions comprising:
        receiving, by using the transceiver, a file block request which comprises a replication factor to create a file block in the distributed file system network, wherein the replication factor indicates how many of the data storage nodes are required to store a replica of the file block;
        generating a file block placement option for placing the file block in at least one data storage nodes in the distributed file system network in response to receiving the file block request, wherein generating the file block placement option comprising:
            generating a list of file block placement options;
            calculating a cost function equation for each of the file block placement options based on variables of the cost function equation which are being evaluated in real time and consisting essentially of a block placement request (BPR), a current placement option (CPO), a cluster topology (CT), a network status (NS), a storage status (SS), and a processing status (PS) so as to calculate a cost valuation parameter from the cost function equation; and
            selecting the file block placement option having a minimum cost valuation parameter among the file block placement options;
        generating a network control instruction set based at least in part on the file block placement option; and
        sending, by using the transceiver, the network control instruction set to a controller node in communication with the distributed file system network for the controller node to carry out the selected file placement option according to the network control instruction.

11. The computing device of claim 10, wherein each of the BPR, CPO, CT, NS, SS, and PS are multiplied by a respective weight.

12. The computing device of claim 10, wherein calculating the cost function equation for each of the file block placement options based on BPR, CPO, CT, NS, SS, and PS comprising:
    calculating the cost function equation for each of the file block placement options based on BPR, CPO, CT, NS, SS, and PS to determine a hop count for the CPO.

13. The computing device of claim 12, wherein calculating the cost function equation for each of the file block placement options based on BPR, CPO, CT, NS, SS, and PS comprising: calculating the cost function equation for each of the file block placement options based on BPR, CPO, CT, NS, SS, and PS to determine a storage utilization rate of a network node.

14. The computing device of claim 10, wherein the network control instruction set includes an instruction for the controller node to enable routing of the file block to the at least one data storage nodes.

15. The computing device of claim 14, wherein the controller node enables routing of the file block to the at least one data storage nodes by sending a new flow entry command to at least one of the plurality of network nodes.

16. The computing device of claim 14, wherein the controller node enables routing of the file block to the at least one data storage nodes by reconfiguring an existing network connection between two or more of the plurality of network nodes.

17. The computing device of claim 14, wherein the controller node enables routing of the file block to the at least one data storage nodes by applying a data traffic policing algorithm to at least one of the plurality of network nodes.

18. The computing device of claim 10, wherein the network control instruction set includes an instruction to adjust a bandwidth reservation for an existing network traffic flow.

19. A distributed file system network, comprising:
 a network node having a file managing capability and comprising a transceiver and a processor which is configured to generate a file block placement option for placement of a file block and to generate a network control instruction set based at least in part on the file block placement option, wherein generate the file block placement option for placement of the file block and to generate a network control instruction set based at least in part on the file block placement option comprising:
  receive, by using the transceiver, a file block request which comprises a replication factor to create a file block in the distributed file system network, wherein the replication factor indicates how many of the data storage nodes are required to store a replica of the file block;
  generate a file block placement option for placing the file block in at least one data storage nodes in the distributed file system network in response to receiving the file block request, wherein generate the file block placement option comprising:
   generate a list of file block placement options;
   calculating a cost function equation for each of the file block placement options based on variables of the cost function equation which are being evaluated in real time and consisting essentially of a block placement request (BPR), a current placement option (CPO), a cluster topology (CT), a network status (NS), a storage status (SS), and a processing status (PS) so as to calculate a cost valuation parameter from the cost function equation; and
   select the file block placement option having a minimum cost valuation parameter among the file block placement options;
  generate a network control instruction set based at least in part on the file block placement option; and
  send, by using the transceiver, the network control instruction set to a controller node in communication with the distributed file system network;
 a controller node, comprising a transceiver and a processor which is configured to receive, by using the transceiver of the controller node, the network control instruction set for enable routing of the file block;
 at least one data storage nodes, comprising a transceiver and a processor which is configured to receive the file block to carry out the selected file placement option according to the network control instruction.

20. The distributed file system network of claim 19, wherein each of the BPR, CPO, CT, NS, SS, and PS are multiplied by a respective weight and calculating the cost function equation for each of the file block placement options based on BPR, CPO, CT, NS, SS, and PS comprising: calculating the cost function equation for each of the file block placement options based on BPR, CPO, CT, NS, SS, and PS to determine a hop count for the CPO.

* * * * *